(12) United States Patent
Sharma et al.

(10) Patent No.: US 9,548,576 B2
(45) Date of Patent: Jan. 17, 2017

(54) CONNECTOR ASSEMBLY FOR AN ELECTRONIC DEVICE

(71) Applicant: Intel Corporation, Santa Clara, CA (US)

(72) Inventors: Sameer Sharma, Santa Clara, CA (US); Douglas Satzger, Santa Clara, CA (US); Gadi Amit, San Mateo, CA (US); Yoshikazu Hoshino, San Francisco, CA (US); Chadwick Harber, San Francisco, CA (US); Daniel Clifton, San Francisco, CA (US); Philip J. Houdek, II, San Jose, CA (US); Stanislav Moiseyenko, Mountain View, CA (US); Nathan Jauvtis, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/930,124

(22) Filed: Nov. 2, 2015

(65) Prior Publication Data

US 2016/0056592 A1 Feb. 25, 2016

Related U.S. Application Data

(62) Division of application No. 13/839,448, filed on Mar. 15, 2013, now Pat. No. 9,176,537.

(51) Int. Cl.
*H01R 24/58* (2011.01)
*G06F 1/16* (2006.01)
(Continued)

(52) U.S. Cl.
CPC ............. *H01R 24/58* (2013.01); *G06F 1/1616* (2013.01); *G06F 1/1633* (2013.01);
(Continued)

(58) Field of Classification Search
CPC ...... G06F 1/1616; G06F 1/1618; G06F 1/168; G06F 1/181; H01R 24/58; H01R 13/7033
(Continued)

(56) References Cited

U.S. PATENT DOCUMENTS 5,118,309 A * 6/1992 Ford ..................... H01R 24/58
439/620.21
5,773,332 A 6/1998 Glad
(Continued)

FOREIGN PATENT DOCUMENTS

CN 201 927 865 U 8/2011
CN 202 059 007 U 11/2011
(Continued)

OTHER PUBLICATIONS

International Search Report and Written Opinion in International Application No. PCT/US2014/028606, mailed Jul. 29, 2014, 12 pages.
(Continued)

*Primary Examiner* — Abdullah Riyami
*Assistant Examiner* — Harshad Patel
(74) *Attorney, Agent, or Firm* — Patent Capital Group

(57) ABSTRACT

An electronic device includes an audio jack assembly that is to receive an audio input, wherein the audio jack assembly is provided concentrically with a circular recess of the electronic device, wherein the circular recess is within a hinge assembly of the electronic device, and wherein the audio jack assembly is in engagement with the hinge assembly.

15 Claims, 16 Drawing Sheets

(51) Int. Cl.
*G06F 21/31* (2013.01)
*H01R 43/16* (2006.01)
*H01R 107/00* (2006.01)

(52) U.S. Cl.
CPC .......... *G06F 1/1656* (2013.01); *G06F 1/1669* (2013.01); *G06F 1/1683* (2013.01); *G06F 21/31* (2013.01); *H01R 43/16* (2013.01); *H01R 2107/00* (2013.01)

(58) Field of Classification Search
USPC ....... 439/668, 669, 672, 667, 620.12, 620.1, 439/675
See application file for complete search history.

(56) References Cited

U.S. PATENT DOCUMENTS

| | | | | |
|---|---|---|---|---|
| 6,368,156 | B1* | 4/2002 | Lin | H01R 24/76 439/188 |
| 6,688,918 | B2* | 2/2004 | Wang | H01R 23/10 439/668 |
| 6,851,975 | B2* | 2/2005 | VanEpps, Jr. | H01R 24/58 439/592 |
| 7,112,099 | B2* | 9/2006 | Ma | H01R 24/78 439/668 |
| 7,241,179 | B2* | 7/2007 | Chennakeshu | H01R 13/35 439/668 |
| 7,484,981 | B2* | 2/2009 | Garcia | H01R 13/523 439/271 |
| 7,509,143 | B2 | 3/2009 | Lintern et al. | |
| 7,789,712 | B1* | 9/2010 | Peng | H01R 24/58 439/668 |
| 7,794,285 | B1* | 9/2010 | Huang | H01R 24/58 439/668 |
| 7,806,734 | B1* | 10/2010 | Yu | H01R 24/58 439/668 |
| 7,907,230 | B2* | 3/2011 | Goto | G06F 1/1616 349/58 |
| 8,047,878 | B2* | 11/2011 | Szini | H01R 24/50 439/668 |
| 8,662,937 | B2* | 3/2014 | Tian | H01R 12/716 439/668 |
| 8,696,391 | B2* | 4/2014 | Ladouceur | H01R 13/639 439/668 |
| 8,870,604 | B2* | 10/2014 | Chang | H01R 13/7033 439/669 |
| 9,176,537 | B2 | 11/2015 | Sharma et al. | |
| 2002/0114130 | A1 | 8/2002 | Schremmer et al. | |
| 2009/0011793 | A1* | 1/2009 | Pocrass | H04M 1/274516 455/556.1 |
| 2009/0035977 | A1 | 2/2009 | Chen et al. | |
| 2010/0155489 | A1 | 6/2010 | Chang | |
| 2011/0116747 | A1 | 5/2011 | Terlizzi et al. | |
| 2011/0319132 | A1 | 12/2011 | Hsu | |
| 2014/0273590 | A1 | 9/2014 | Sharma et al. | |

FOREIGN PATENT DOCUMENTS

| | | |
|---|---|---|
| EP | 2 381 653 A2 | 10/2011 |
| EP | 2 498 202 A2 | 9/2012 |
| EP | 2 466 696 B1 | 1/2013 |
| JP | 2004-021451 | 1/2004 |
| TW | 201140293 A | 11/2011 |
| WO | WO 2014/144271 A1 | 9/2014 |

OTHER PUBLICATIONS

USPTO Feb. 20, 2015 Nonfinal Rejection in U.S. Appl. No. 13/839,448 , 26 pages.
USPTO Jun. 26, 2015 Notice of Allowance in U.S. Appl. No. 13/839,448 , 9 pages.
International Preliminary Report on Patentability in International Application No. PCT/US2014/028606 , mailed Sep. 15, 2015, 9 pages.
Office Action and Search Report in TW Application No. 103107443, mailed on Jan. 22, 2016, English translation, 15 pages.
Office Action in JP Application No. 2015-557241, mailed on Jul. 12, 2016, with English translation, 10 pages.
Office Action and Search Report in RU Application No. 2015134101, mailed on Aug. 31, 2016, with English translation, 20 pages.
Supplementary Partial European Search Report in EP Application No. 14 76 5000, mailed Oct. 21, 2016, 7 pages.

* cited by examiner

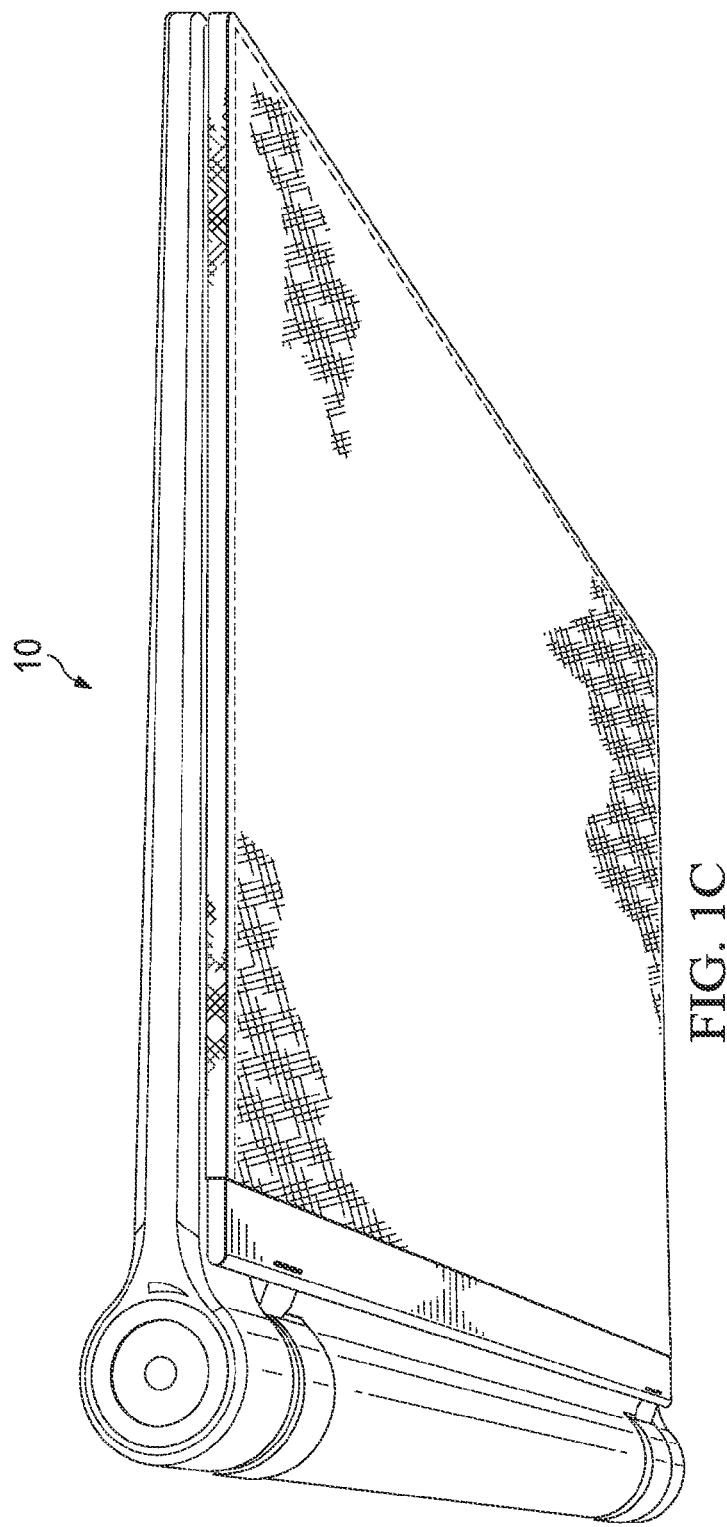

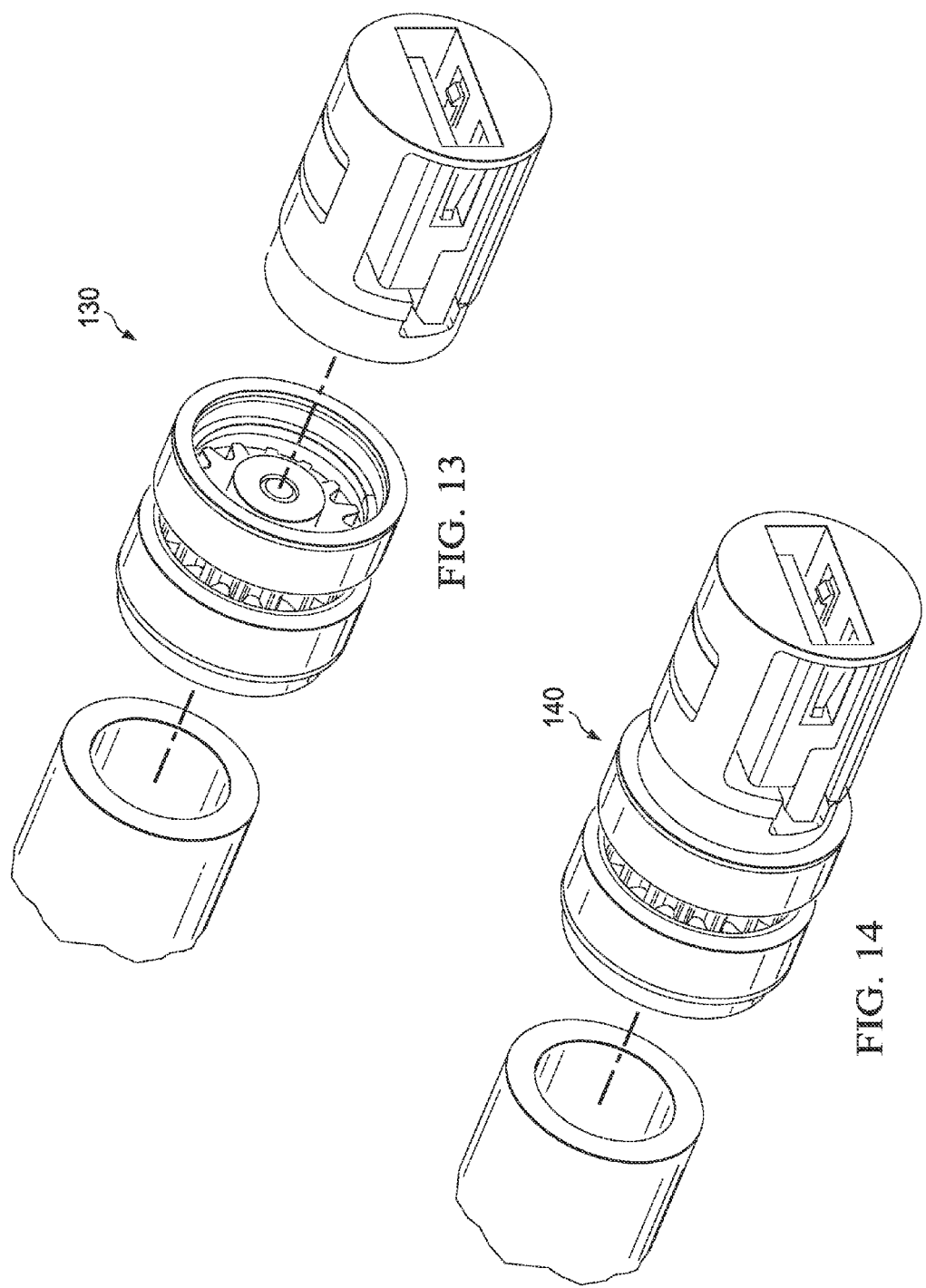

CONNECTOR ASSEMBLY FOR AN ELECTRONIC DEVICE

RELATED APPLICATION

This application is a divisional (and claims the benefit under 35 U.S.C. §120) of U.S. application Ser. No. 13/839,448, filed Mar. 15, 2013, entitled "CONNECTOR ASSEMBLY FOR AN ELECTRONIC DEVICE," Inventors Sameer Sharma, et al. The disclosure of the prior application is considered part of (and is incorporated by reference in) the disclosure of this application in its entirety.

TECHNICAL FIELD

Examples described herein generally relate to connector assembly configurations for an electronic device.

BRIEF DESCRIPTION OF THE DRAWINGS

Examples are illustrated by way of example and not by way of limitation in the FIGURES of the accompanying drawings, in which like references indicate similar elements and in which:

FIG. 1C is a simplified schematic diagram illustrating an electronic device in a closed configuration with an attached accessory cover, in accordance with one example of the present disclosure;

FIGS. 11-14 are simplified schematic diagrams illustrating certain hinge assembly components associated with the electronic device;

Figure 1A:
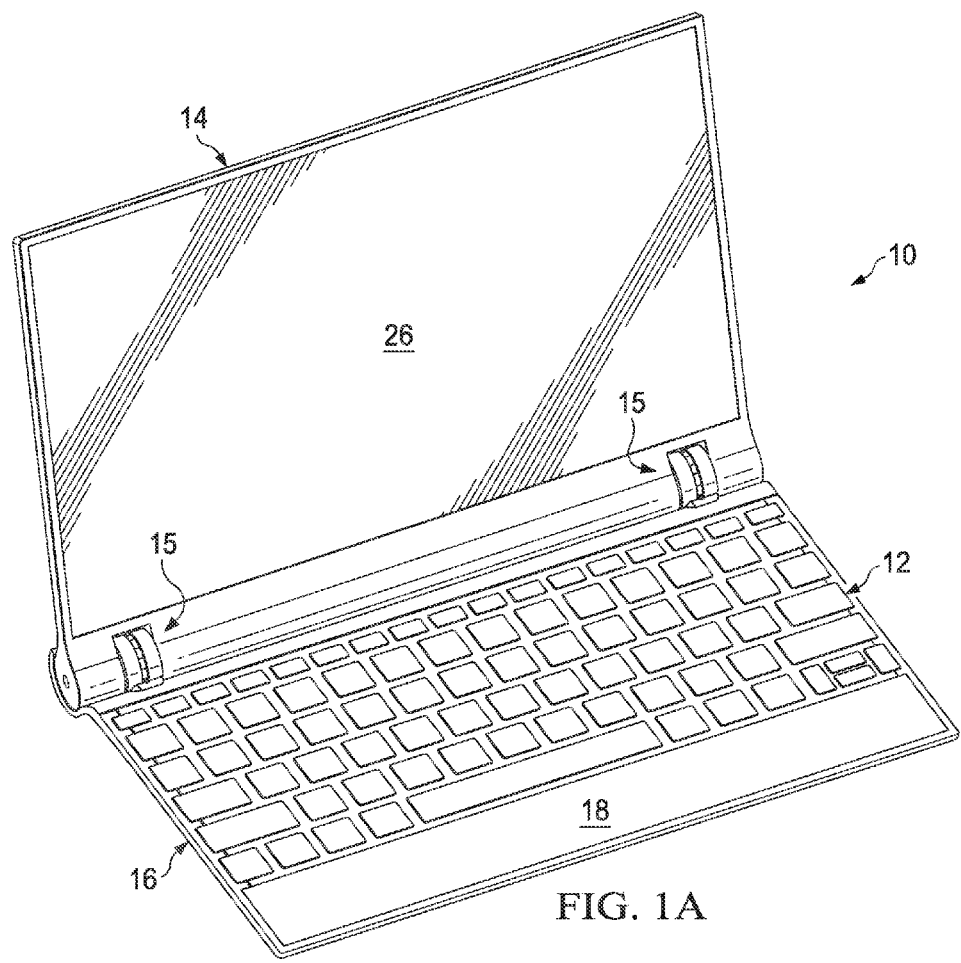
FIG. 1A is a simplified schematic diagram illustrating an electronic device in an open configuration with an attached keyboard, in accordance with one example of the present disclosure.

The FIGURES of the drawings are not necessarily drawn to scale, as their dimensions can be varied considerably without departing from the scope of the present disclosure.

SUMMARY OF EXAMPLES

One embodiment of an electronic device comprises an audio jack assembly that is to receive an audio input, wherein the audio jack assembly is provided concentrically with a circular recess of the electronic device. In another embodiment, the audio jack assembly is secured by a snap ring that is to mate with an internal portion of a ferrous ring. In another embodiment, the audio jack assembly further comprises a spring-loaded contact that is loaded against a shaft of a clutch mechanism of the electronic device. In another embodiment, an electrical pathway is defined from the shaft of the clutch through the spring-loaded contact. In another embodiment, the spring-loaded contact is a post to provide a connection to a circuit board of the audio jack assembly. In another embodiment, the circular recess is within a hinge assembly of the electronic device. In another embodiment, the audio jack assembly is in engagement with the hinge assembly. In another embodiment, the hinge assembly is configured to couple a top portion and a base portion of the electronic device. In another embodiment, the hinge assembly is configured to couple a portion of the electronic device to an accessory.

An embodiment of a connector assembly for an electronic device comprises an audio jack module, wherein the audio jack module is configured to be installed concentrically with a circular recess of the electronic device. In another embodiment, the audio jack module is configured to be secured by a snap ring that is to mate with an internal portion of a ferrous ring. In another embodiment, the audio jack module further comprises a spring-loaded contact that is configured to be loaded against a shaft of a clutch mechanism of the electronic device. In another embodiment, an electrical pathway is defined from the shaft of the clutch through the spring-loaded contact. In another embodiment, the spring-loaded contact is a post to provide a connection to a circuit board of the audio jack module. In another embodiment, the circular recess is within a hinge assembly of the electronic device. In another embodiment, the audio jack module is configured to be in engagement with the hinge assembly. In another embodiment, the hinge assembly is configured to couple a top portion and a base portion of the electronic device. In another embodiment, the hinge assembly is configured to couple a portion of the electronic device to an accessory.

An embodiment of a method for providing a connector assembly for an electronic device, comprising: receiving an audio jack assembly concentrically with a circular recess of the electronic device; and facilitating an electrical contact between the electronic device and the audio jack assembly. In another embodiment, the circular recess is within a hinge assembly of the electronic device.

Detailed Description of Examples

The following detailed description sets forth example examples of apparatuses, methods, and systems relating to hinge configurations for an electronic device. Features such as structure(s), function(s), and/or characteristic(s), for example, are described with reference to one example implementation as a matter of convenience; various examples may be implemented with any suitable one or more of the described features.

Traditionally, tablet devices and their associated accessories exist with minimal integration. For example, tablet devices typically use universal serial bus (USB) connector slots, subscriber identification module (SIM) card trays, and audio jacks. These elements often consume valuable tablet surface space and, further, occupy internal real estate. Connectors are typically located in areas on the device that are not ideal for unobtrusive connections. Wherever possible, elements should be consolidated or integrated in order to conserve space. As with all consumer electronics, usability and performance are of paramount importance. Connectors that are provisioned on any computing device should enhance usability, and not interfere with user activity.

In one particular example, the design of the present disclosure can integrate a USB connector assembly and a SIM assembly into a compact volume space. Further, the design can provide a rigid flex cable assembly that connects the USB module to a tablet board. The design may also provide a connector location on the device that enhances the usability of the connector. In a particular implementation, the USB connector assembly/SIM assembly and audio jack can include a rigid flex cable assembly connects the module to the tablet board.

Particular examples described herein can also provide for an electronic device, such as a notebook computer, an Ultrabook™, a laptop, a cellphone (or smartphone of any kind), or other mobile device that includes a circuit board coupled to a plurality of electronic components (which includes any type of components, elements, circuitry, etc.). The electronic device may also include a base portion and a top portion coupled to the base portion at a hinge configured such that the base portion and the top portion can rotate between an open configuration of the electronic device and a closed configuration of the electronic device (and hold positions with respect to one another at points in between open and closed). Certain examples presented herein can offer an effective hinge and docking capability that provides an orientation flexibility and connection to enable a more extensive integration between the electronic device (e.g., a tablet) and an accessory (e.g., a keyboard, audio system, a movie player system, a docking station, accessory cover, etc.).

The electronic device may also include a hinge assembly to selectively secure (e.g., based on a desired configuration) a top portion of the electronic device to an accessory. The hinge assembly is to allow a rotation of the top portion in relation to the accessory. The hinge assembly includes one or more discs to receive one or more segments of the accessory, as the hinge assembly engages to secure the top portion of the electronic device to the accessory. In more particular examples, the hinge assembly includes a disc-toothed wheel to receive the one or a plurality of segments of the accessory in order to secure the top portion to the accessory. Additionally, the accessory may include one or more rib segments to provide an alignment function, as the hinge assembly of the device engages the accessory (providing increased strength and stiffness to this area of the accessory). In an example that includes magnets in this particular region of the accessory, these rib segments can provide the additional function of focusing the magnetic force of the magnets. In addition, the accessory may include one tooth (or a plurality of teeth features) to provide resistance to a rotational motion between the hinge assembly and the accessory, allowing them to hold their relative positions without user interaction. In addition, the accessory may include one or more magnetic bands that attract one or more rings provided in the top portion.

In an example, the accessory docking features of the accessory do not include magnets. Instead, the device can be retained by the accessory at the hinge connection point by the accessory engaging features of the electronic device with an over center (or other type of) mechanical snap retention.

In yet other examples, an electronic device is provided that includes a hinge assembly to selectively secure a top portion of the electronic device to an accessory. The hinge assembly is to allow a rotation of the top portion in relation to the accessory, and the hinge assembly includes at least a three-piece snap configuration (or a four-piece, a five-piece, etc.) that is to provide a retention force between the top portion and the accessory. Power signals can be run separately through each of the three pieces of the three-piece snap configuration. Alternatively, the power signals can be run through a middle piece of the three-piece snap configuration, and two outer pieces of the three-piece snap configuration can be insulators. The accessory can be a keyboard that includes a keyboard side snap with one piece, and a plurality of slots can be provided to allow an independent motion of outer snap bands of the keyboard.

Connector Assembly for Electronic Device

FIG. 1A is a simplified schematic diagram illustrating an example of an electronic device 10 in an open configuration in accordance with one example of the present disclosure. Electronic device 10 may include a base portion 16, comprising a keyboard 12, a touchpad 18, and a top portion 14, comprising a display 26 and one or more discs 15. Display 26 may be disposed within/on and/or supported by top portion 14. In one or more examples, display 26 is a screen that can be a liquid crystal display (LCD) display screen, a light-emitting diode (LED) display screen, an organic light-emitting diode (OLED) display screen, a plasma display screen, or any other suitable display screen system.

In one or more examples, electronic device 10 is a notebook computer or laptop computer. In still other examples, electronic device 10 may be any suitable electronic device having a display such as a mobile device, a tablet computer and/or a tablet device (e.g., an i-Pad™), a personal digital assistant (PDA), a smartphone (an i-Phone™, Android™, etc.), an audio system, a movie player of any type, a computer docking station, etc.

In general terms, electronic device 10 can offer a suitably comfortable grip for an end user to manipulate base portion 16 (e.g., to separate it from top portion 14). Electronic device 10 may also include one or multiple discs 15 that enable an integrated detachable accessory solution from mechanical, electrical, and aesthetical standpoints. The accessory band design feature can provide mechanical and magnetic lead-in guidance and attraction force for retention during docking. Additionally, electronic device 10 may use a mechanical snap-in feature to easily attach, retain, and detach any accessory. The power of electronic device 10 can be physically isolated from its chassis and/or, further, it can be integrated within one or more of its disc assemblies. Moreover, electronic device 10 can offer docking that allows power and/or data to flow between the device and the accessory (e.g., keyboard) to which it is docked. In addition, electronic device 10 can offer a space saving integration of a clutch mechanism residing inside the volume of the disc feature. Additionally, electronic device 10 can offer an improved range of motion for the display when the device is oriented in a laptop mode, as detailed below.

Electronic device 10 may also include a middle portion that is provided between base portion 16 and top portion 14. The middle portion may aesthetically cover a portion of hinges 15 (or be proximate to multiple hinges 15) existing between base portion 16 and top portion 14. Hinges 15 can define an axis of rotation that is shared between base portion 16 and top portion 14. In one example, base portion 16 and top portion 14 are hingedly coupled via one or more hinges 15 (as shown).

In the particular example shown in FIG. 1A, electronic device 10 is a relatively thin and sleek tablet having a touch screen (e.g., 10-inch screen) and a detachable and re-attachable keyboard accessory. Electronic device 10 provides for an integrated device that can include a display section (containing a main logic board and barrel installed batteries) and a keyboard section. In addition, its hinge mechanism allows the display section to be attached to the keyboard in two different orientations: the display facing inward and the display facing outward. This mechanism can provide multiple modes (possible configurations), such as a laptop mode, tablet mode, movie mode (as well as closed mode) to a user. All of these configurations are discussed below with reference to various FIGURES that further illustrate some of the operational capabilities associated with electronic device 10.

For the particular magnetic keyboard design, it should be noted that the keyboards that are currently available for tablets do not offer a suitable user experience. Typing on glass is ergonomically uncomfortable and, separately, typical Bluetooth keyboards are thick and cumbersome. In contrast to those flawed systems, the keyboard option for electronic device 10 can provide a user experience that replicates a more traditional computer keyboard experience. Additionally, from the perspective of the user, the key travel feels like a common computer keyboard (e.g., travel could be approximately 0.5 mm vs. 2.5 mm on a traditional computer keyboard, but feels the same). Moreover, there is enough separation between the keys to make it easier for touch-typers to distinguish between keys for improved touch-typing.

In a particular example, the keyboard is an ultra-thin (e.g., 3.30 mm), ultra-light (e.g., 275 grams) keyboard with sufficient keyboard band stiffness and strength to serve as a tablet device cover. The keyboard can be made from a laminate construction that uses variations of key design shapes and magnets to replicate a touch-typing user experience with the feel of a typical computer keyboard. In order to account for the thinner side areas of the keyboard device, the keyboard edge keys may be pivoted on one side and, further, may have magnets only on one side in a particular example of the present disclosure. The keys can be of any suitable type such as toggle operation keys, for example, with an arrow key operation that merges four keys that cannot move diagonally. A magnet can be provisioned at various locations of the keyboard (e.g., away from the center of the keys).

In operation, the spacing between the keys of the keyboard can enable a touch-typer to easily distinguish between keys with fingers. Edge keys can be specially designed for thinner sides and, further, utilize varying magnet configurations. An edge key configuration allows keys to hang over the edge of the support base to accommodate the thinner sides of the keyboard device. Magnets can be suitably positioned to minimize the toggle affect. Toggle key configuration is used with the arrow keys.

For the magnetic keys, the use of magnets embedded within the keys and attracted to a ferrous top plate above the sides of the keys can provide the user with the sense of a traditional computer keyboard key travel and rigidity. The keyboard can also provide a physical keystroke confirming the depression of the key. In certain implementations, the keyboard keys are magnetically biased upward with electrically conductive pads beneath the keys, which trigger a key press. For the actual keyboard construction, a laminate construction may be employed in conjunction with an injection mold, where the metal is integrated into the plastic. A flexible printed circuit board (FPC) can also be used in certain examples of the present disclosure. Connections can be formed to the bands and a small battery may be optionally inserted into the keyboard to provide a limited backup power supply. In one non-limiting example, the tablet keyboard dimensions are approximately: 261.40 mm(X)×170.16 mm(Y)×3.30 mm (Z, key top-to-bottom surface). Other examples of the keyboard can include any suitable dimensions, sizes, and shapes: all of which are encompassed by the present disclosure.

Note that any number of connectors (e.g., Universal Serial Bus (USB) connectors (e.g., in compliance with the USB 3.0 Specification, or any other version), Thunderbolt™ connectors, WiFi connectors, a non-standard connection point such as a docking connector, etc.) and a plurality of antennas can be provisioned in conjunction with electronic device 10. [Thunderbolt™ and the Thunderbolt logo are trademarks of Intel Corporation in the U.S. and/or other countries.] The antennas are reflective of electrical components that can convert electric currents into radio waves. In particular examples, the antennas can be associated with WiFi activities, wireless connections more generally, small cell deployments, Bluetooth, 802.11, etc.

In one example, the board (e.g., a motherboard) of electronic device 10 is a general circuit board that can hold various components of the internal electronic system of electronic device 10. The components may include a central processing unit (CPU), a memory, etc. The board can also couple to one or more connectors in order to accommodate other peripherals sought to be used by a user of electronic device 10. More specifically, the board can provide the electrical connections by which the other components of the system can communicate.

Any processors (inclusive of digital signal processors, microprocessors, supporting chipsets, etc.), memory elements, etc. can be suitably coupled to the board based on particular configuration needs, processing demands, computer designs, etc. Other components such as external storage, controllers for video display, sound, and peripheral devices may be attached to the board as plug-in cards, via cables, or integrated into the board itself.

Note that particular examples of the present disclosure may readily include a system on chip (SOC) central processing unit (CPU) package. An SOC represents an integrated circuit (IC) that integrates components of a computer or other electronic system into a single chip. It may contain digital, analog, mixed-signal, and often radio frequency functions: all of which may be provided on a single chip substrate.

In a particular example, touchpad 18 is a pointing device that features a tactile sensor, a specialized surface that can translate the motion and position of a user's fingers to a relative position on screen. Touchpad 18 can be used in place of a mouse (e.g., where desk space is scarce or based on user preference). Touchpad 18 can operate using capacitive sensing, conductance sensing, or any other appropriate sensing technology. In a particular example, a suitable battery can be provisioned proximate to touchpad 18 in order to power its operations. In addition, either surface (or both surfaces) of display 26 can be a touch display that uses any of the technologies discussed herein.

Figure 1B:
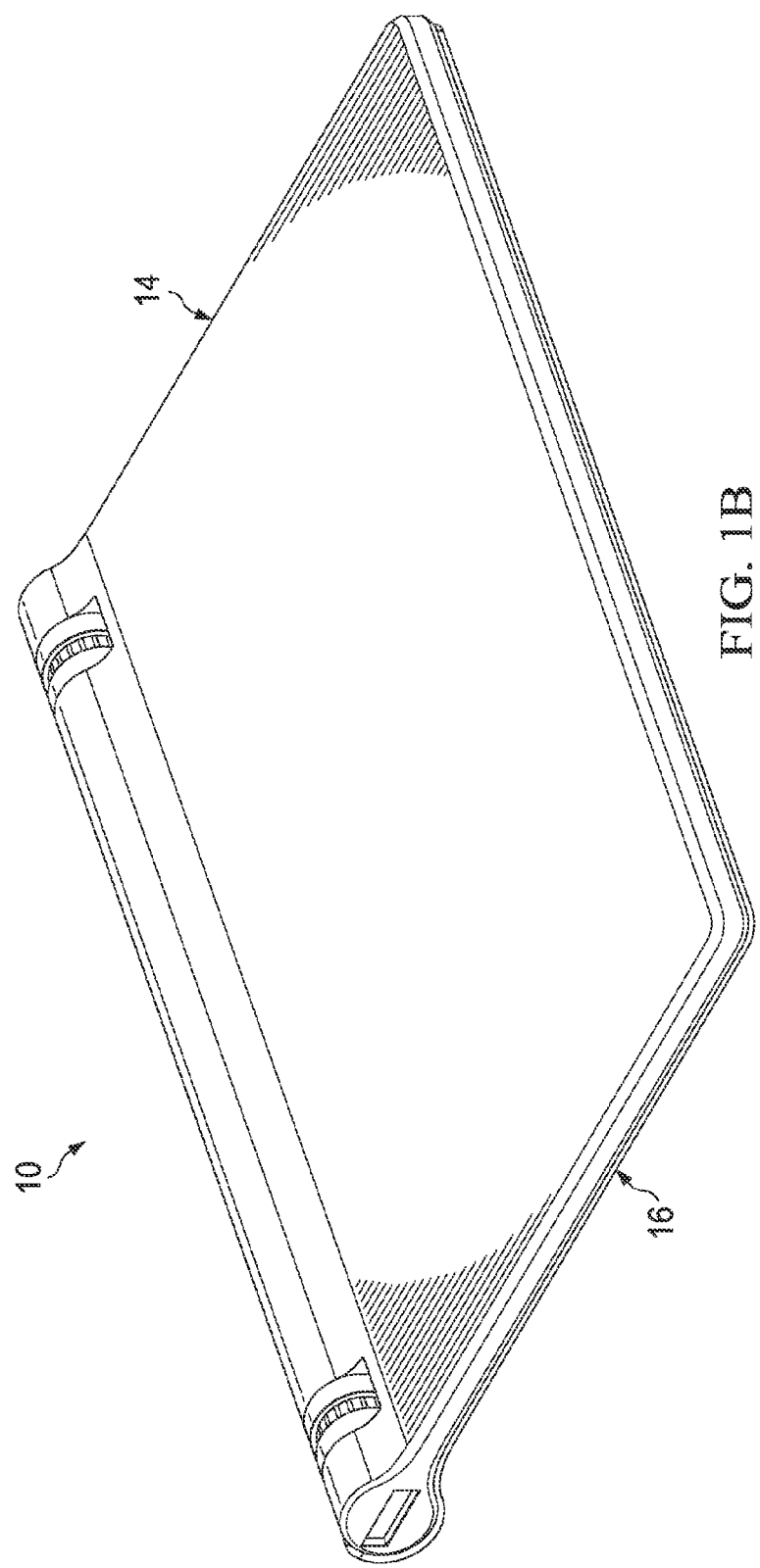
FIG. 1B is a simplified schematic diagram illustrating an electronic device with an attached keyboard, in a closed configuration in accordance with one example of the present disclosure.

Turning briefly to FIG. 1B, FIG. 1B is a simplified schematic diagram illustrating a side view of electronic device 10 in a closed configuration. In operation, when electronic device 10 is in a closed position, the thin plastic keyboard can protect the display. When the display section is flipped up to an open position, it operates in a traditional laptop orientation (i.e., a keyboard resting on a surface with a display held in an upright position). In a particular example, electronic device 10 includes an 18.5 mm pitch full-size keyboard that provides for an optimal touch-typing experience. When the display section is flipped upside-down to face outwardly away from the key elements of the keyboard, electronic device 10 can operate in a tablet configuration with the keyboard nested behind the screen and out of the way of user interaction. Its barrel-shaped hinge mechanism feature can serve as an ideal grip for the end user. In this mode, the keyboard can be stowed behind the display. In the tablet mode, the display can still be flipped up. In this mode, the keyboard can operate as a stand (behind the display), and the device can become a stationary display (e.g., movie mode). When the display section is detached from the keyboard, it can function as a simple lightweight tablet by itself.

In the case where the accessory of electronic device 10 is a keyboard, then the keyboard main components can include various elements. For example, the keyboard can include a keyboard body reflective of a unibody-molded part that may use insert and/or comolding methods to eliminate visible fasteners. In addition, the keyboard body may further include insert-molded band features to provide stiffness to the outer portion of the scoop geometry as well as transmit rotational loads, which inhibit top portion 14 from rotating with respect to bottom portion 16. Also provided are one or more band features that can provide for a magnetic attraction of the ferrous disc shaped features of the tablet. Electrical current can be passed from the tablet to the keyboard to recharge an on-board battery or capacitor, or power any number of items (e.g., a Bluetooth radio). Additionally, the tablet can be suitably anchored to the keyboard to prohibit a toothed disc feature from rotating with respect to the keyboard, while allowing the tablet to concentrically rotate in the "scoop" part of the keyboard through one or more clutch elements in the tablet.

For the actual keys, in a particular non-limiting example, the keys are configured with a 0.5 mm travel distance (for individual keys). In addition, tactile feedback can be provided (e.g., 70 gram with "cliff drop" force deflection feel) to mimic the typing experience of traditional keyboards. In certain implementations, there is little (or no) dead space on the key surface. There can be various types of keys on the keyboard. For example, the keyboard can include pivoting keys (e.g., left edge: tilde, tab, caps lock, shift, left ctrl; right edge: backspace, backslash, enter, shift), rocking keys such as the arrow keys, and substantially vertical travel keys such as function keys and other keys that are not along the right or left edge, etc.

Electronic device 10 can also include a nonferrous web that provides sufficient stiffness to the keyboard body. The web can provide a guide for keys to move vertically, but appropriately restrain x-y motion. In addition, a ferrous top plate can increase the stiffness of keyboard, retain keys from falling out, and attract magnetic keys to bias them upwards.

In terms of Bluetooth capability, the power can reach the radio by passing current through the bands/socket. The tablet can include electrically protected (but "hot") toothed discs. The Bluetooth radio circuit board can have a direct current (DC) rectifier to power the electronics independent of the orientation of the tablet (i.e., laptop mode vs. tablet mode, etc.).

In certain example examples, the design of electronic device 10 can allow a tablet to connect to the keyboard in both a laptop type mode and a tablet type mode, in addition to a movie stand type mode. The range of viewing angle adjustment is continuous (e.g., extending between 0 and 125°, or 150°, or more, or different ranges may be provided). 0° can correspond to the fully closed position, whereas 125° or similar can be defined as fully opened. There are two socket modules built into the tablet side of the device, which are magnetically attracted to the nesting features built into the keyboard. FIG. 1C is a simplified schematic diagram illustrating an example of electronic device 10 in a closed configuration with an attached accessory cover in accordance with one example of the present disclosure.

Figure 1F:
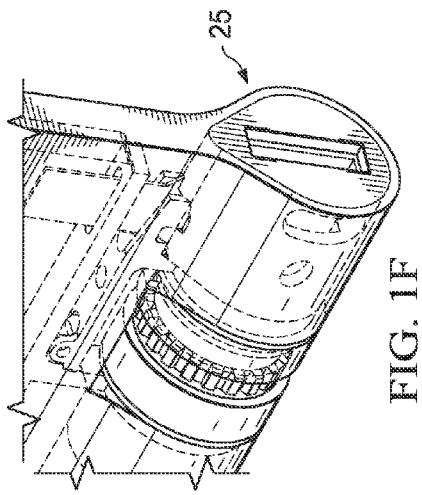
FIGS. 1F-1G are simplified schematic diagrams illustrating one example insertion of the USB connector assembly into a housing of the electronic device.
Figure 1H:
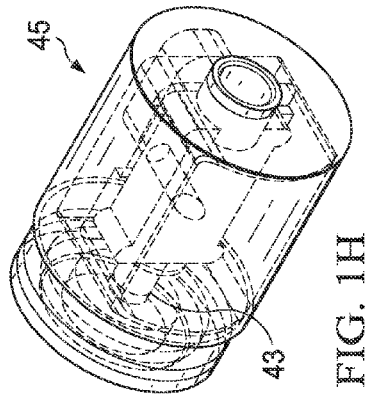
FIG. 1H is a simplified schematic diagram illustrating an audio jack in accordance with one example of the present disclosure.
Figure 1E:
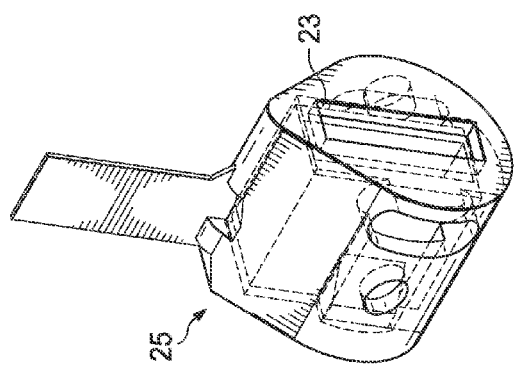
FIGS. 1D-1E are simplified schematic diagrams illustrating an example of a universal serial bus (USB) connector assembly associated with the present disclosure.
Figure 1D:
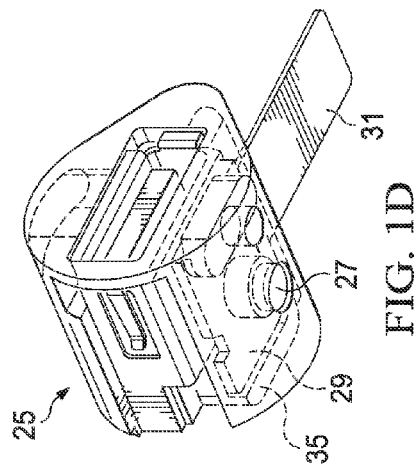

FIGS. 1D-1E are simplified schematic diagrams illustrating an example of a USB connector assembly, which is generally indicated by an arrow 25. A particular example includes a USB connector 23, a SIM card 29, and a flexible printed circuit (FPC) 31. As illustrated in FIG. 1D, a pre-load clamping post 27 is also provided to USB connector assembly 25. In a particular example, SIM card 29 is mounted in the USB assembly. The SIM card can be easily serviceable, yet hidden through the housing of the electronic device. As with the case of a mobile phone, the user can access the SIM card, but it is encased and protected in an appropriate manner.

Note that SIM card 29 represents an integrated circuit, which can securely store an identifier (e.g., international mobile subscriber identity WSW and/or the related key used to associate any user with a device. In more specific examples, the SIM can identify and authenticate subscribers on computing devices (e.g., tablets, laptops, Ultrabooks™, mobile phones, smartphones, etc.). SIM card 29 can be transferred between different mobile devices. Additionally, SIM card 29 may contain its unique serial number (ICCID), security authentication and ciphering information, temporary information related to the local network, a list of the services the user has access to, passwords, etc.

In one example, USB connector assembly 25 may include a SIM card clamping mechanism, which can offer a lower profile for the accompanying hardware. The clamping mechanism can use the barrel of the electronic device and a compression member (e.g., a pre-load of clamping post 27), which pushes against the outboard barrel (when assembled) to ensure an electrical connection between the SIM card and the SIM card cradle contacts. In operation, pre-load clamping post 27 (which could be a simple button, a dimple, a knob, any bias or spring-loaded component, etc.) can bias the center of the SIM card, as the SIM card-clamping mechanism is inserted into the housing of a given device. In one example, as the SIM card-clamping mechanism is slid into the barrel, the button pushes against the inner wall of the barrel, which transfers a force to the SIM card that is subsequently pushed into the cradle. This creates a low-profile, integrated clamping mechanism. In operation, SIM card 29 is to be pressed against the contacts for the SIM card to be operational. Hence, the SIM card clamping mechanism represents a way to effectively position the SIM card into its cradle to ensure the appropriate contact.

Pre-load clamping post 27 can also be part of a disassembly latch mechanism. This provides a mechanism for servicing/accessing the SIM card. Hence, SIM card 29 is provided with a hidden (but accessible) latching mechanism, along with an FPC with a service loop, which allows for the removal of the integrated USB/SIM assembly. In a particular example, USB connector assembly 25 (also termed a USB module, as discussed herein) is located within the outboard part of the barrel of electronic device. The module can contain USB connector 23, the PCB, the clamping mechanism for the SIM card, and an interposer 35.

In one example, a rigid flex cable assembly connects the module to a tablet board. The geometry of the flex and the way it is folded is such that it forms a single loop that is contained by a pocket within the module. Thus, the electrical connection with the device board is consistently maintained. The loop allows for the flex to be unfolded when the module is partially removed from the outboard barrel for SIM card servicing. In addition, interposer 35 is a vertically conductive material (e.g., having a 0.8 mm thickness). It can provide the electrical connection between the module's PCB and the SIM card. A SIM card can be positioned within a special keyed pocket and then pressed against interposer 35 by the clamping mechanism. The clamping can be actuated by inserting the module into the barrel.

Figure 1G:
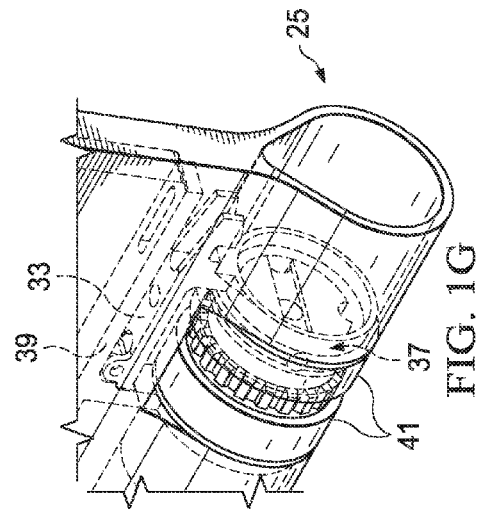

FIGS. 1F-1G are simplified schematic diagrams illustrating one example insertion of USB connector assembly 25 into a housing of computing device (e.g., a tablet, a laptop, a mobile device of any kind, etc.). FIG. 1G illustrates USB connector assembly 25 having been removed. FIG. 1G also illustrates a self-contained latching assembly 39 and a related latching mechanism 33, which may or may not be spring-loaded. For example, a small hole may be provided on top of latching mechanism 33 to house a spring that helps to bias the latch downward. Latching mechanism 33 can be manipulated (e.g., lifted by a tool, a paperclip, etc.) in order to release the USB assembly. In one example, the USB assembly can slide in an outboard direction (toward the right, in this illustration of FIG. 1G).

Also illustrated in FIG. 1G is a collet mechanism 37. Collect mechanism 37 provides a selectively engageable clamping mechanism to retain one or more outboard ferrous rings 41. Ferrous rings 41 can include a plurality of balls (that are pushed radially outward), a rotatable locking cam ring that secures balls in the outward position when assembled, and a clocking feature that aligns with the USB/SIM assembly to prevent rotation of the locking cam ring when assembled. It should be noted that it is possible to eliminate this element by removing the collet and replacing it with snap rings to retain the outboard ferrous ring. In operation, USB connector assembly 25 can be secured within the barrel by latching mechanism 33. The access to the latching mechanism can be located out of sight, behind the toothed wheel/ferrous bands assembly. To remove the USB module, an operator can reach into the area behind the toothed wheel assembly and then press the latch with a small flat screwdriver (or a similar tool).

The same outboard barrel that contains the USB module can also contain the toothed wheel/ferrous band support assembly. The assembly can be secured by a collet-type design that is actuated by a 60-degree turn of a pressure bushing. A bushing can be turned by a simple tool such as flat screwdriver, for example. Once rotated into position where it locks the assembly, the bushing is timed by USB module extension, which interlocks with a timing cut on the bushing, as the USB module is inserted. When the USB module is removed, the pressure bushing is allowed to be rotated into the position where it releases the clutch assembly. Once the clutch assembly is released, it can be removed, part by part, and the battery can be serviced.

FIG. 1H is a simplified schematic diagram illustrating an audio jack 45 in accordance with one example of the present disclosure. Audio jack 45 can receive any suitable audio, media, etc. input. In addition, audio jack 45 may include a spring-loaded contact 43 in a particular example. In one particular implementation, the audio jack connector is located in the outboard barrel, opposite of that containing the USB connector assembly. Its configuration can be similar to that of the USB module (in terms of assembly and electrical connectors to the board). It is not however intended to be removable by the user. In operation of one example scenario, after the audio jack module is installed, it also serves as a pillow block for the toothed wheel's outboard end of the shaft.

In a particular implementation, the audio jack is mounted concentrically with the barrel, where the audio jack assembly slides into the barrel of the opposite end of the USB assembly. The audio jack can be held in place by a specialized retention mechanism (e.g., a nut that receives objects (e.g., screws, fasteners, etc.) from the inside portion of the barrel). The audio jack assembly can also provide a path of electrical conductivity between the toothed disc and the enclosure. Spring-loaded contact 43 is provided in the assembly and, further, can be loaded against the shaft of the clutch mechanism. The toothed disc is electrically conductive, while being isolated from the chassis. In one particular example, an electrical pathway is defined from the toothed disc, through the shaft of the clutch, and through spring-loaded contact 43, which can be viewed as a post that provides a suitable connection to the PCB of the audio jack assembly.

In one embodiment, a snap ring is used as a securing mechanism. The snap ring can be received or captured by the audio jack and, further, mate with an inner feature of a ferrous ring. Conceivably, the snap ring could mate to a feature in the inner wall of the circular recess (barrel) to provide support for the ferrous ring and to prevent the audio jack from falling out, but this method does not provide audio jack serviceability in the way other embodiments do, as discussed herein.

Figure 2:
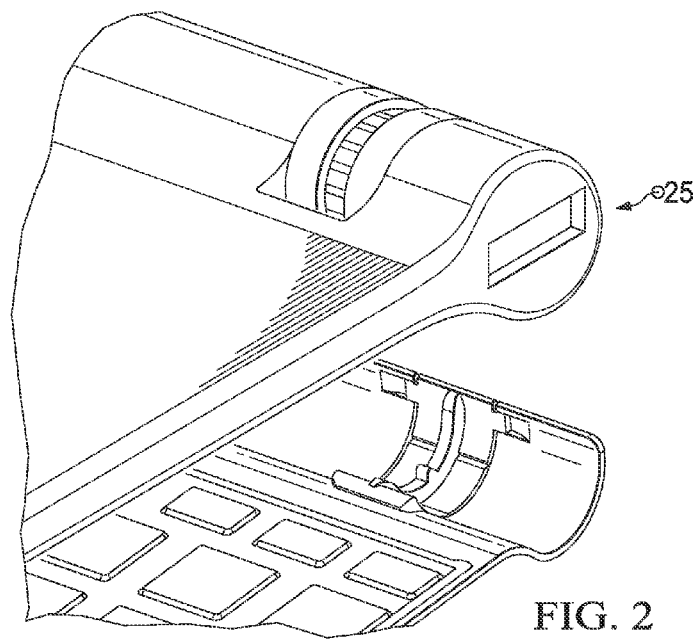
FIG. 2 is a simplified schematic diagram illustrating an orthographic view of the electronic device shown separated into two segments.
Figure 3:
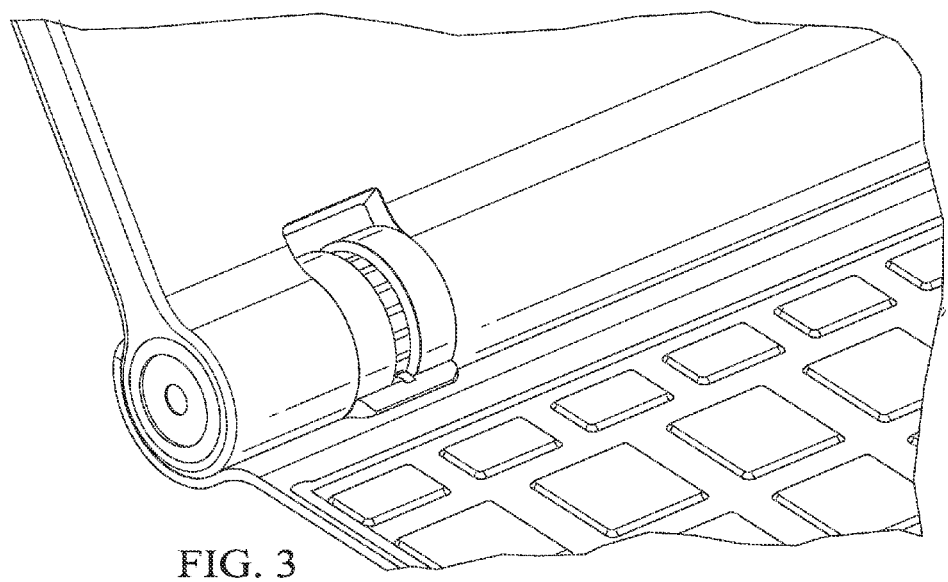
FIG. 3 is a simplified schematic diagram illustrating an orthographic view of the electronic device when the two segments are connected together.

FIG. 2 is a simplified schematic diagram illustrating an orthographic view of electronic device 10 being separated into two segments. FIG. 3 is a simplified schematic diagram illustrating an orthographic view of the electronic device when the two segments are connected together. Focusing for a moment on the disc clutch, the specific design of electronic device 10 integrates the clutch element the resides inside the volume of the disc features of the electronic device and, further, saves space by incorporating elements of the disc into the clutch (i.e., a toothed wheel). In general, the design and assembly mechanism allows the tablet disc sub-assembly to be installed into a slot in the tablet enclosure that is smaller in width than the disc sub-assembly in its installed configuration. The actual disc can be designed with an electrical power connection that is physically isolated from the chassis. Additionally, electronic device 10 offers a friction clutch integration with a disc-toothed wheel feature in the center (or other location) of the disc features in the electronic device (e.g., for improved range of motion, more compact size, position hold capabilities, and better torque transition characteristics).

The magnetic band segments in the accessory (e.g., the keyboard) can attract the ferrous rings of the tablet discs. The center rib (discussed in detail below) provides an amplified magnetic strength focused into the band. During insertion of top portion 14 into bottom portion 16, the center toothed wheel features of the tablet disc, which are connected to the clutch, engage the tooth at the center of the accessory scope. The center rib of the accessory scoop can serve to provide a suitable alignment lead-in function. The encasing can provide a directional focus for the magnetic field. In a particular example, a clutch with bidirectional uniform torque properties is provisioned in the disc. This can allow top portion 14 to be inserted into bottom portion 16 in either orientation and, further, provide the uniform resistance to motion. This is in contrast to a typical standard laptop clutch, which may provide less resistance in one direction or variable resistance based on the angle between the screen and the keyboard.

Figure 4:
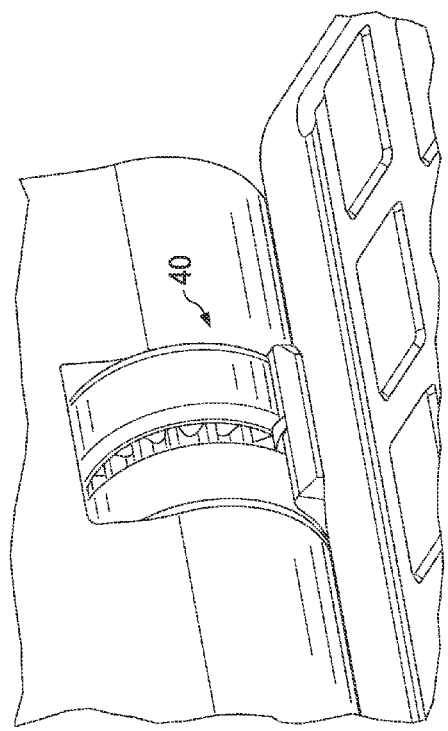
FIG. 4 is a simplified orthographic view of a disc feature of the electronic device.
Figure 5:
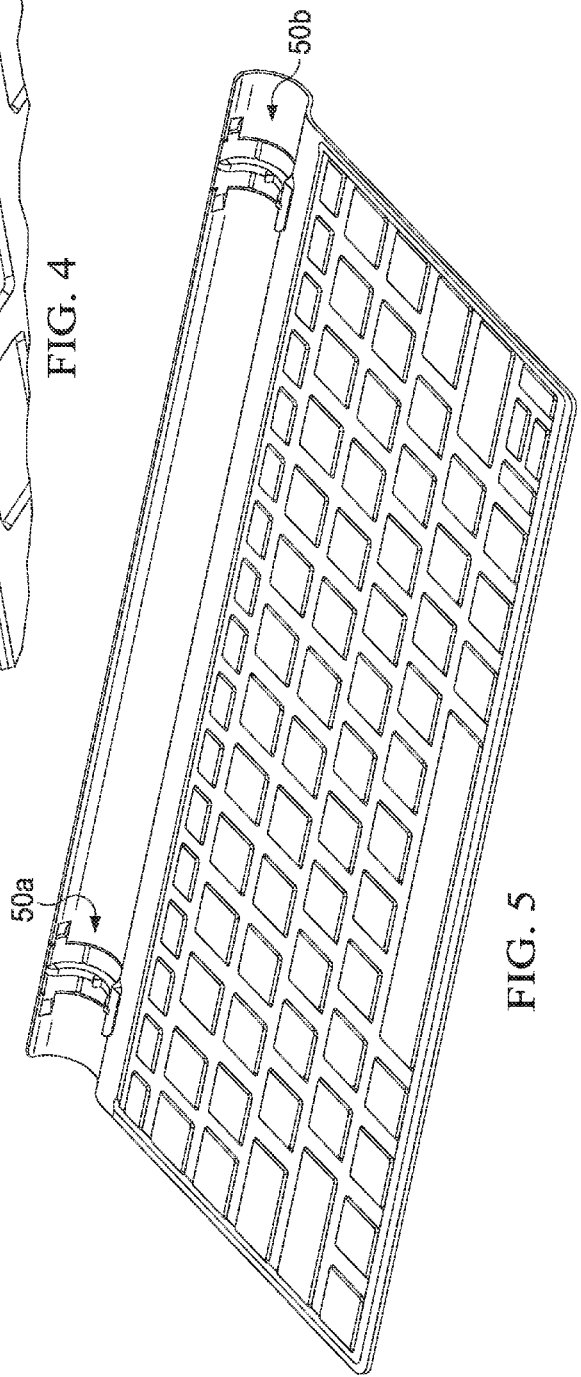
FIG. 5 is a simplified schematic diagram illustrating an orthographic view of an accessory of the electronic device in accordance with one example implementation.

FIG. 4 is a simplified orthographic view of a disc groove 40 of electronic device 10. In this particular example, disc groove 40 can be in the range of 1.0-3.5 millimeters, although alternative examples could have any other suitable dimension. FIG. 5 is a simplified schematic diagram illustrating an orthographic view of a potential accessory of electronic device 10 in accordance with one example implementation. This particular example includes symmetrical segments 50a-50b that can engender a suitable coupling for a given accessory. For example, an accessory such as a keyboard, when attached, becomes integrated to allow power to flow between the tablet's disc mechanism and the keyboard and, thus, power the Bluetooth radio embedded in the keyboard.

Figure 6:
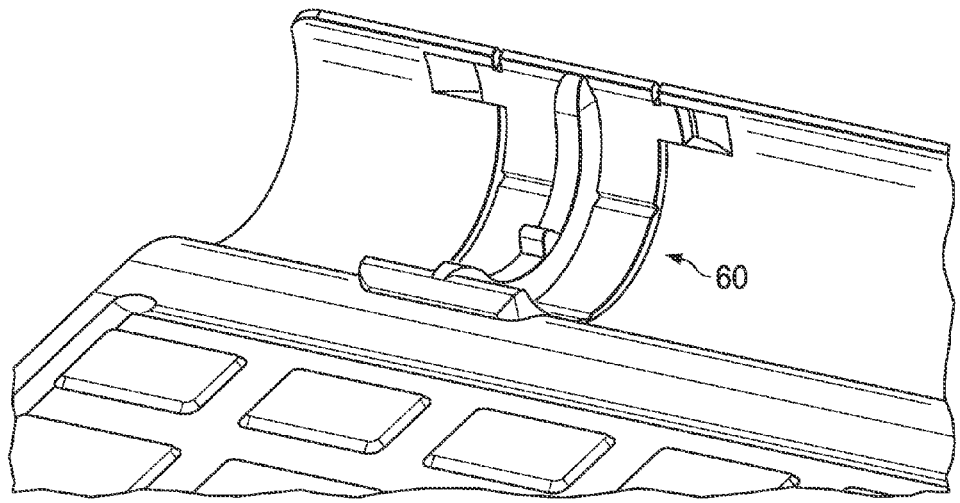
FIG. 6 is a simplified schematic diagram illustrating an orthographic view of the front of an accessory dock connection feature of an accessory device in accordance with one example of the present disclosure.
Figure 7:
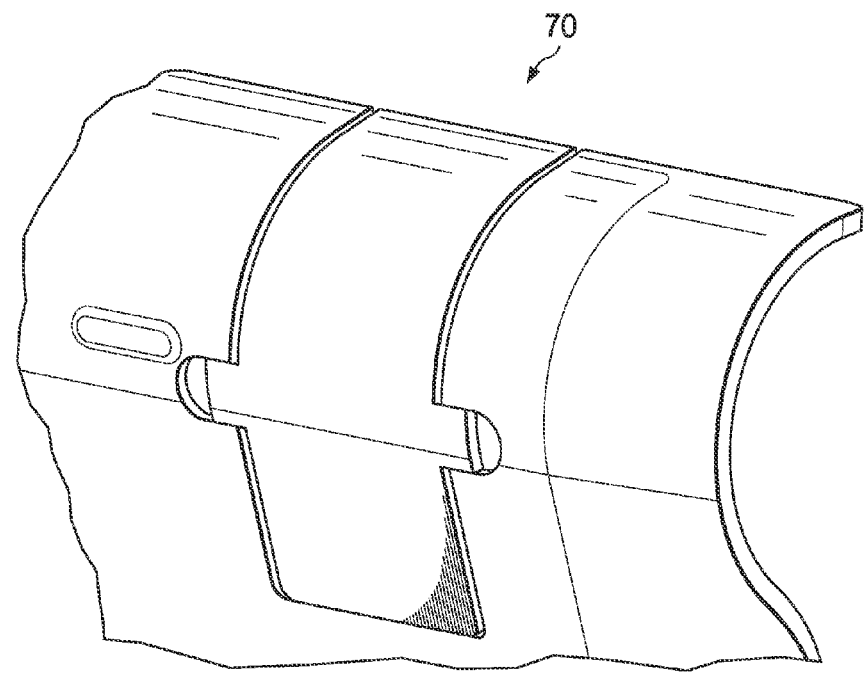
FIG. 7 is a simplified schematic diagram illustrating a view of the rear of an accessory dock connection feature of an accessory device in accordance with one example of the present disclosure.

FIG. 6 is a simplified schematic diagram illustrating an orthographic view of an accessory dock 60 of electronic device 10 in accordance with one example of the present disclosure. Accessory dock 60 can provide a suitable lead-in/guidance feature during connection activities. FIG. 7 is a simplified schematic diagram illustrating the underside of the accessory band components associated with electronic device 10. Magnet components 70 on the opposite side (and installed in the band) may be accompanied by a suitable backing (e.g., a steel backing) to reduce unwanted stray magnetic fields. Without such a backing, magnetic forces would have an increased likelihood of interaction with other components, alter credit card information, corrupt certain storage elements, etc. The shape of the band/keyboard and the tablet transition can allow for a cam-out release of the tablet from the keyboard by using the tablet as a lever to overcome the strong magnetic pull force of the connection. The magnetic pull from the keyboard to the tablet can ensure an electric contact and mechanical connection between the keyboard bands and the tablet. The clutch assembly can be electrically isolated from the tablet and keyboard enclosures to allow positive and negative connections between the tablet and the keyboard made through the two clutches. The physical contact of the toothed wheel features of the tablet disc elements to the torque transmission tooth of the keyboard bands allows for electrical power and/or signals to pass from the tablet to the keyboard. The toothed disc can suitably transmit torque from the keyboard to the tablet. Additionally, certain examples may use a plastic-housed clutch element to electrically isolate the toothed disc from the chassis.

Figure 8:
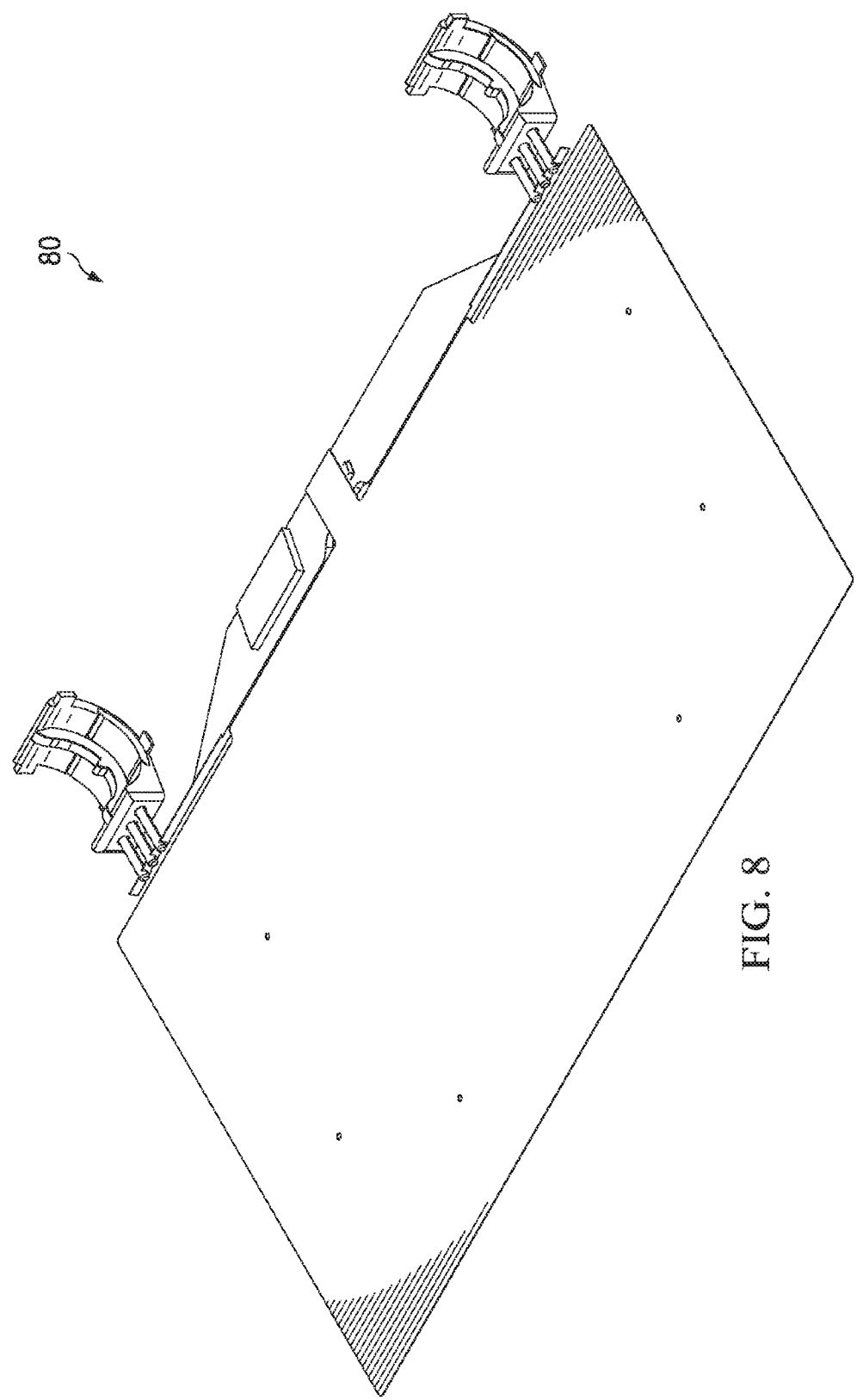
FIG. 8 is a simplified schematic diagram illustrating an orthographic view of an example implementation that includes an integration of an accessory dock connection feature with its magnetic band segments that attract disc elements of the electronic device.
Figure 9:
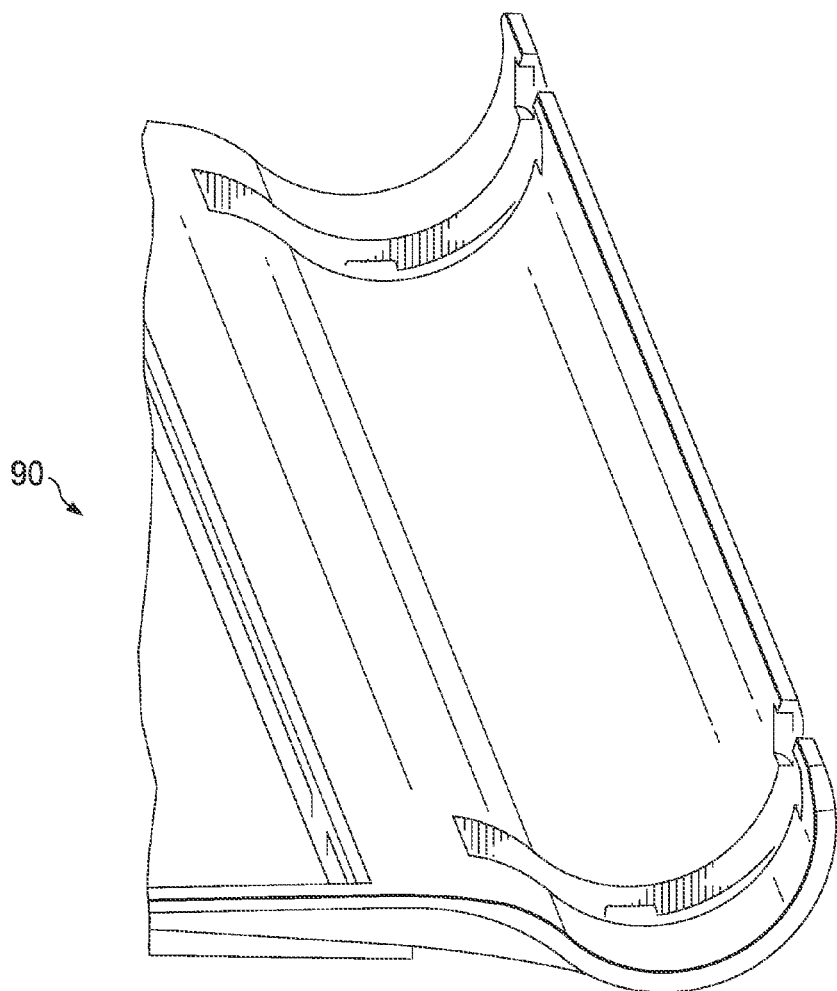
FIG. 9 is a simplified schematic diagram illustrating an orthographic view showing an example implementation of an accessory device without the accessory dock connection features.
Figure 10:
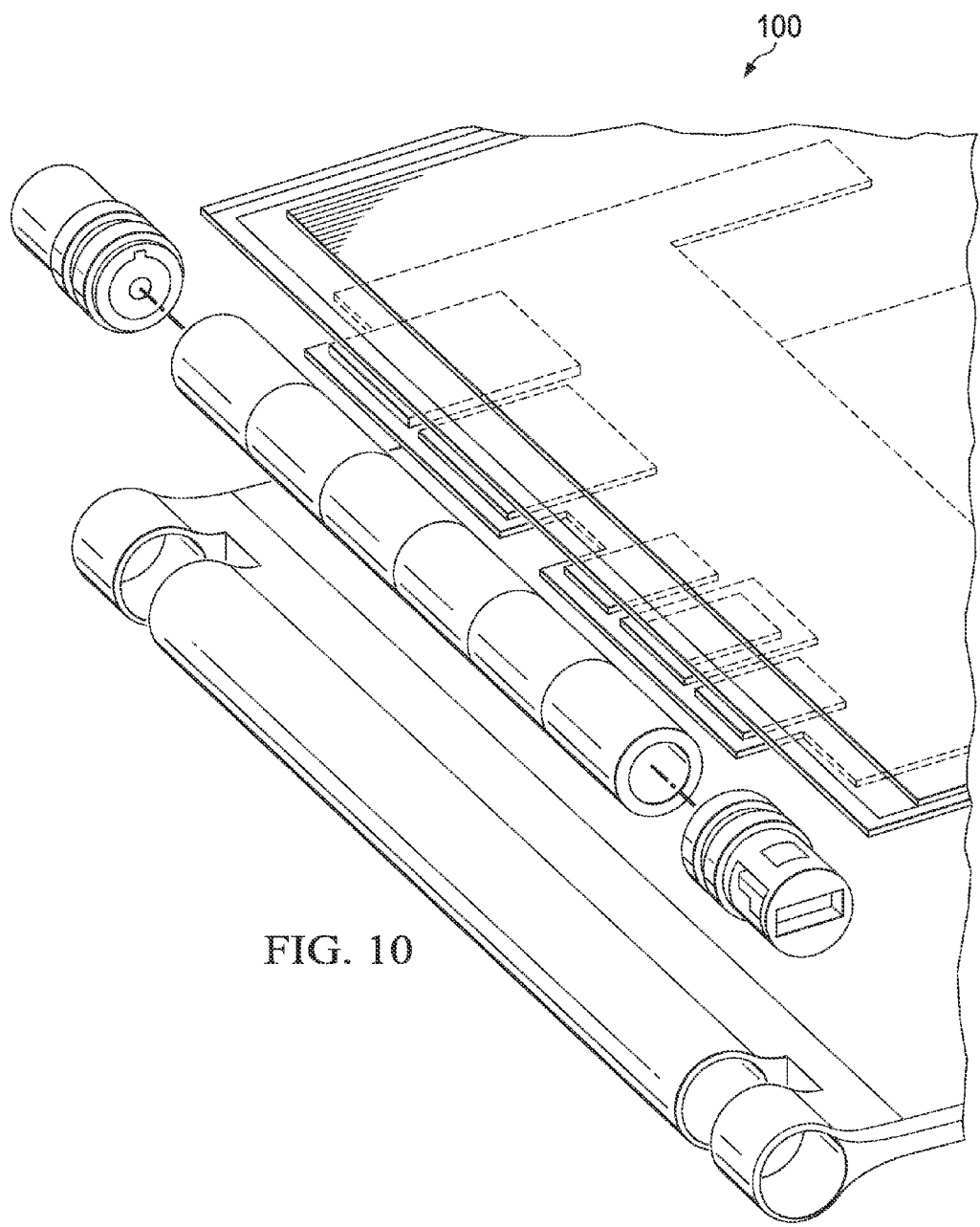
FIG. 10 is a simplified schematic diagram illustrating a hinge assembly associated with the electronic device.
Figure 12:
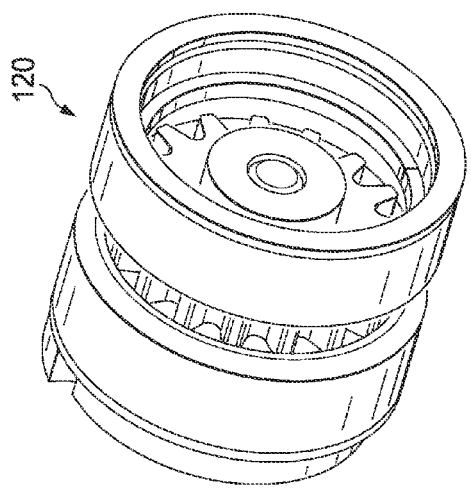
Figure 11:
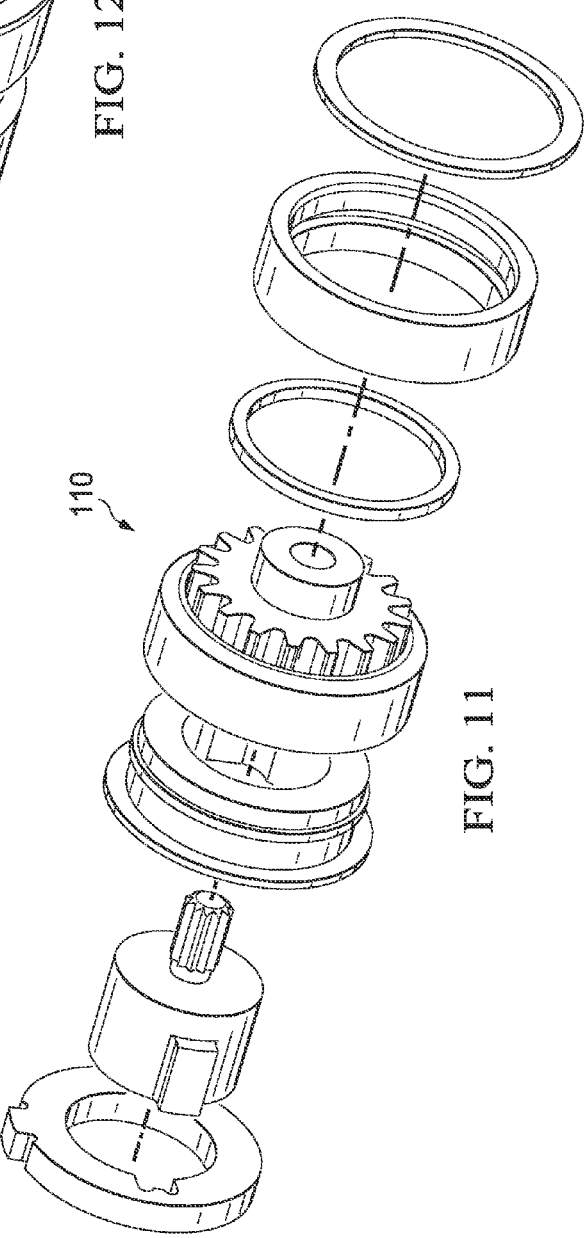
Figure 15:
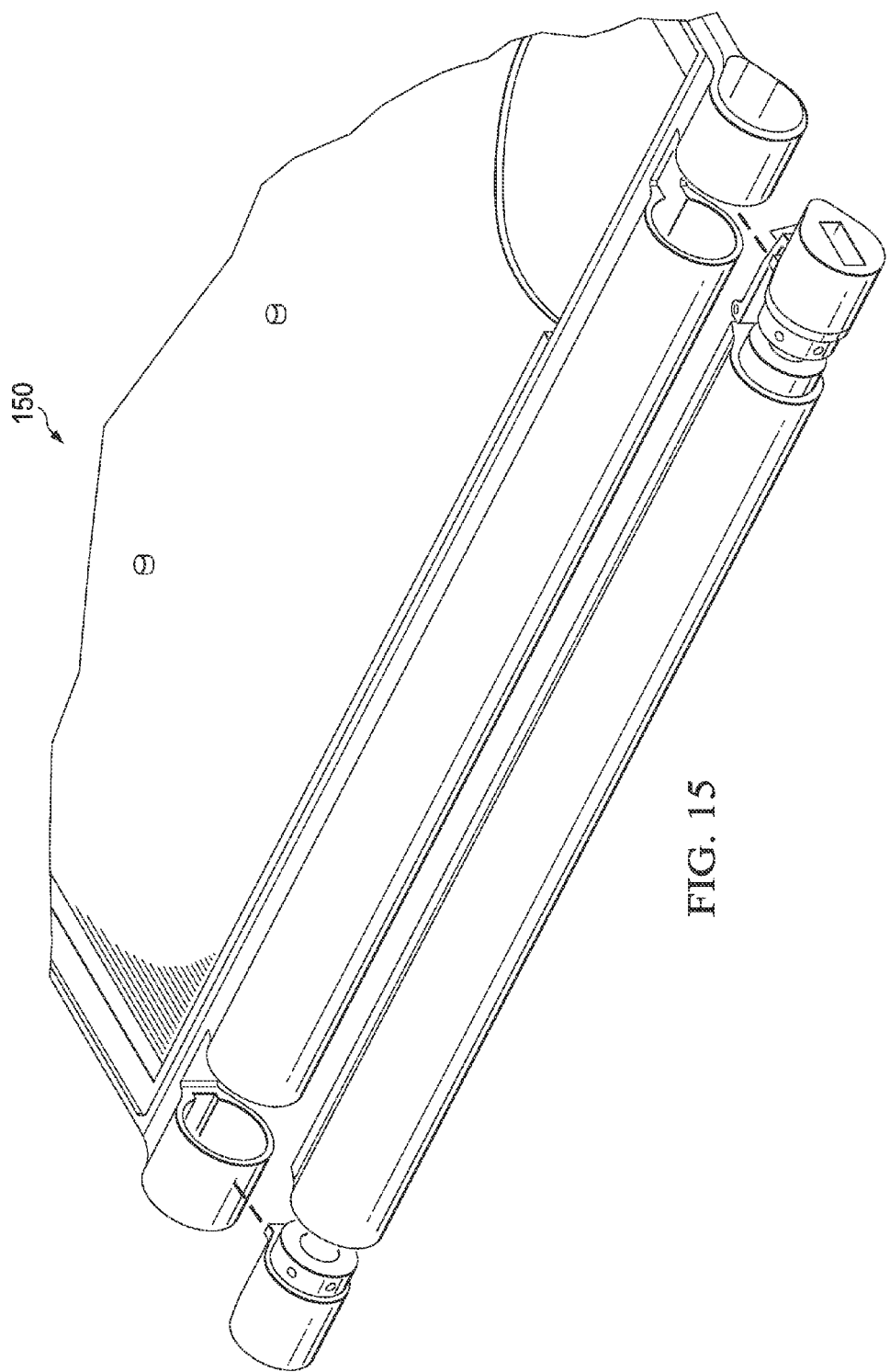
FIG. 15 is a simplified schematic diagram illustrating one potential design arrangement associated with the present disclosure.

FIG. 8 is a simplified schematic diagram illustrating an orthographic view of the keyboard electronics and magnetic bands 80 with the surrounding keyboard housing removed. FIG. 9 illustrates a keyboard housing 90 with the associated keyboard electronics and magnetic bands removed. FIG. 10 is a simplified schematic diagram illustrating a hinge assembly 100 associated with electronic device 10. FIGS. 11-14 are simplified schematic diagrams illustrating certain hinge assembly components 110/120/130/140 associated with electronic device 10. The design and assembly mechanism of electronic device 10 allows assembly of the tablet disc into a slot that is smaller than the assembled disc. FIG. 15 is a simplified schematic diagram illustrating one potential design arrangement 150 associated with the present disclosure.

In operation of one example, there is a three-piece snap for purposes of retention. Power signals can propagate through each of the three pieces separately. In addition, the power signals can run through the middle piece, where the two outer pieces operate as insulators. A keyboard side snap can be provided with one piece, where slots are used to allow for an independent motion of the outer snap bands and inner torque grabbing band/tooth. In yet other implementations, a one-piece snap can be provided without a separation of the three sections. It should be noted that any suitable plastic, fiber-reinforced plastic, highly elastic metal (e.g., titanium) can be used in such examples. Note also that for the one-piece snap, three-piece snap, and the magnetic retention can all be implemented without a clutch in the electronic device. For example, instead of using a clutch mechanism, the electronic device and the accessory can be held in position angularly with respect to one another (e.g., with the friction of their respective cylindrical mating surfaces).

In certain examples, the clutch mechanism does not have to be internal to the device discs (e.g., they can be in the area shown as being occupied by batteries in certain FIGURES). In essence, any clutch mechanism can be used in order to accommodate the teachings of the present disclosure. Additionally, friction forces do not have to be equal in both directions in certain examples of the present disclosure.

For the actual assembly, one of the two ferrous steel bands can be assembled with the torque insert and then inserted into the tablet by sliding it into the center barrel section with the second ferrous steel band loosely present over the center-toothed disc, which has a smaller outer diameter than the inner diameter of the ferrous steel band. Subsequently, the connector sub-assembly can be pushed in from the outside through the outer portion of the tablet barrel and the second ferrous steel band can be secured onto it.

In certain examples, instead of passing power signals through the toothed wheel, certain configurations can pass power signals through one or a plurality of discs with wiping contacts on the accessory side. Other configurations can pass power signals through disc features that are not necessarily the ferrous features being shown, but any other ring of metal could be used as a contact. In yet other examples, power signals can be passed through a plug-in connector (e.g., whose male side protrusion is built into the keyboard side and whose female side is built into the electronic device). This could effectively make the electrical connection and, further, could be used as the sole point of torque transmission between the keyboard and the tablet. Note that such an example is like a scaled-up version of the tooth engaging in the toothed wheel. This might not necessarily be ideal in that it may only allow the tablet and keyboard (or any other accessory) to be connected when they are in one orientation. Virtually any other electrical connection methods could be used and, thus, are clearly within the scope of the present disclosure. Additionally, alternative constructions for the barrel and scoop (which come together at the hinge) could be used without departing from the teachings of present disclosure. Although potentially cumbersome, such configurations represent viable alternative examples of the present disclosure.

Figure 17:
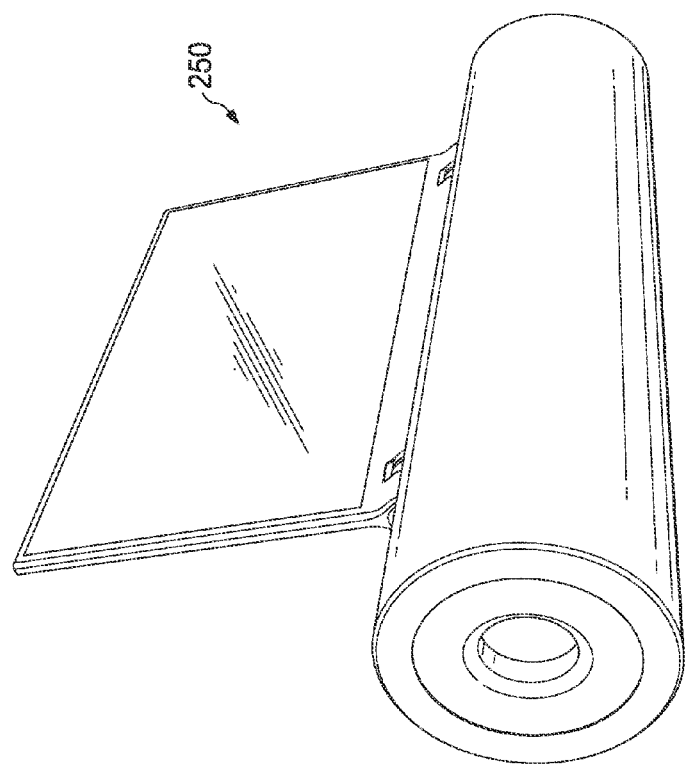
FIG. 17 is a simplified schematic diagram illustrating a speaker example implementation associated with the electronic device.
Figure 16:
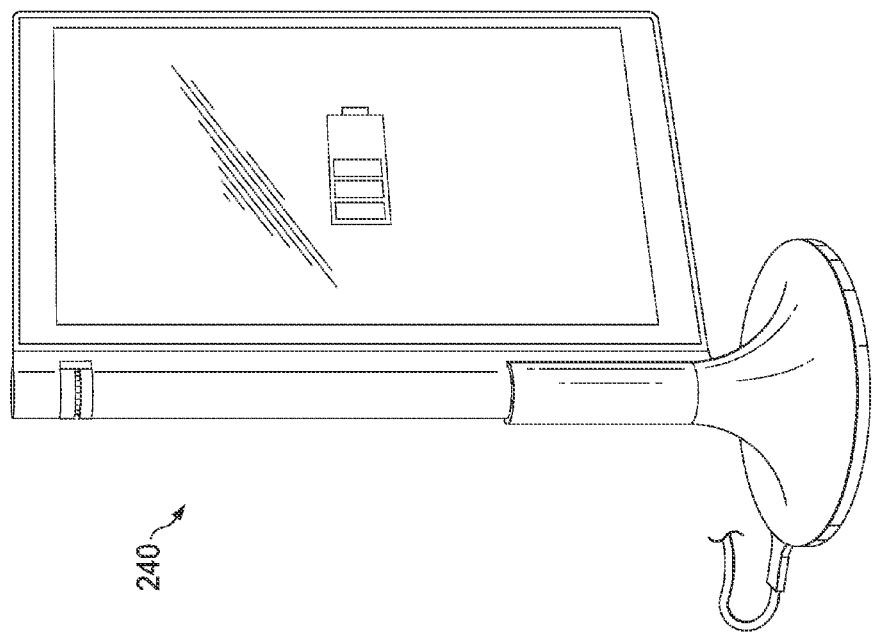
FIG. 16 is a simplified schematic diagram illustrating a docking station example implementation associated with the electronic device.
Figure 18:
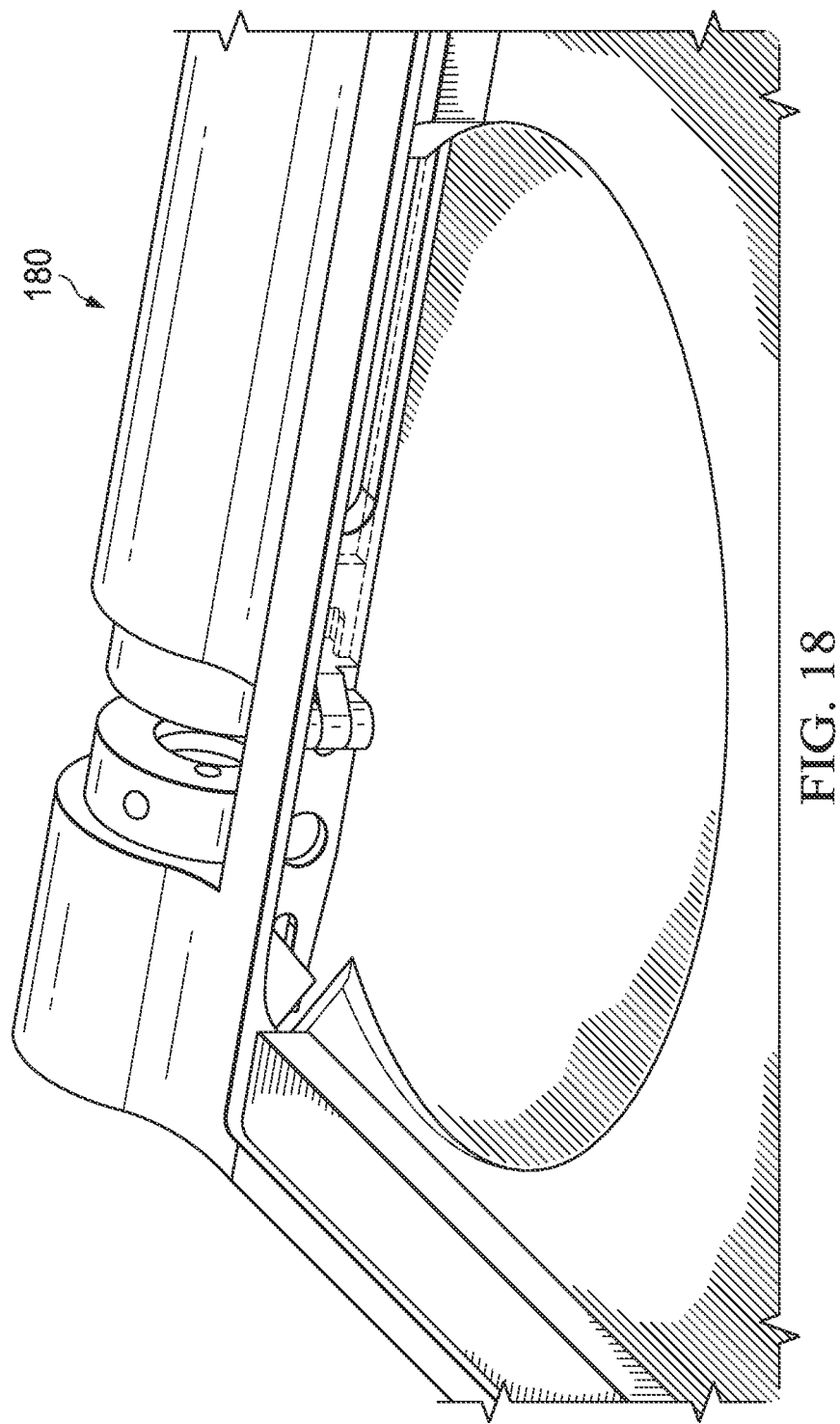
FIG. 18 is a simplified schematic diagram illustrating an alternative hinge design.

FIG. 16 is a simplified schematic diagram illustrating an alternative docking station 160 example associated with electronic device 10. As a general proposition, the disc hinge design of the present disclosure (with power isolated from the chassis) enables a more fully integrated tablet accessory capability, thus engendering countless functioning tablet accessories. For example, docking station 160 is one such implementation. FIG. 17 is a simplified schematic diagram illustrating an alternative speaker example 170 associated with electronic device 10. Any suitable audio system can be provisioned in conjunction with the present disclosure, as the depiction of FIG. 17 is only being offered by way of example. FIG. 18 is a simplified schematic diagram illustrating an alternative hinge design 180 that uses a discrete ball detent mechanism. A detent is a device used to mechanically resist or arrest the rotation of a wheel, axle, or spindle. Such a device can be anything ranging from a simple metal pin to a machine. In a particular example, the detent is used to simply arrest rotation in one direction, or to intentionally divide a rotation into discrete increments.

Figure 19:
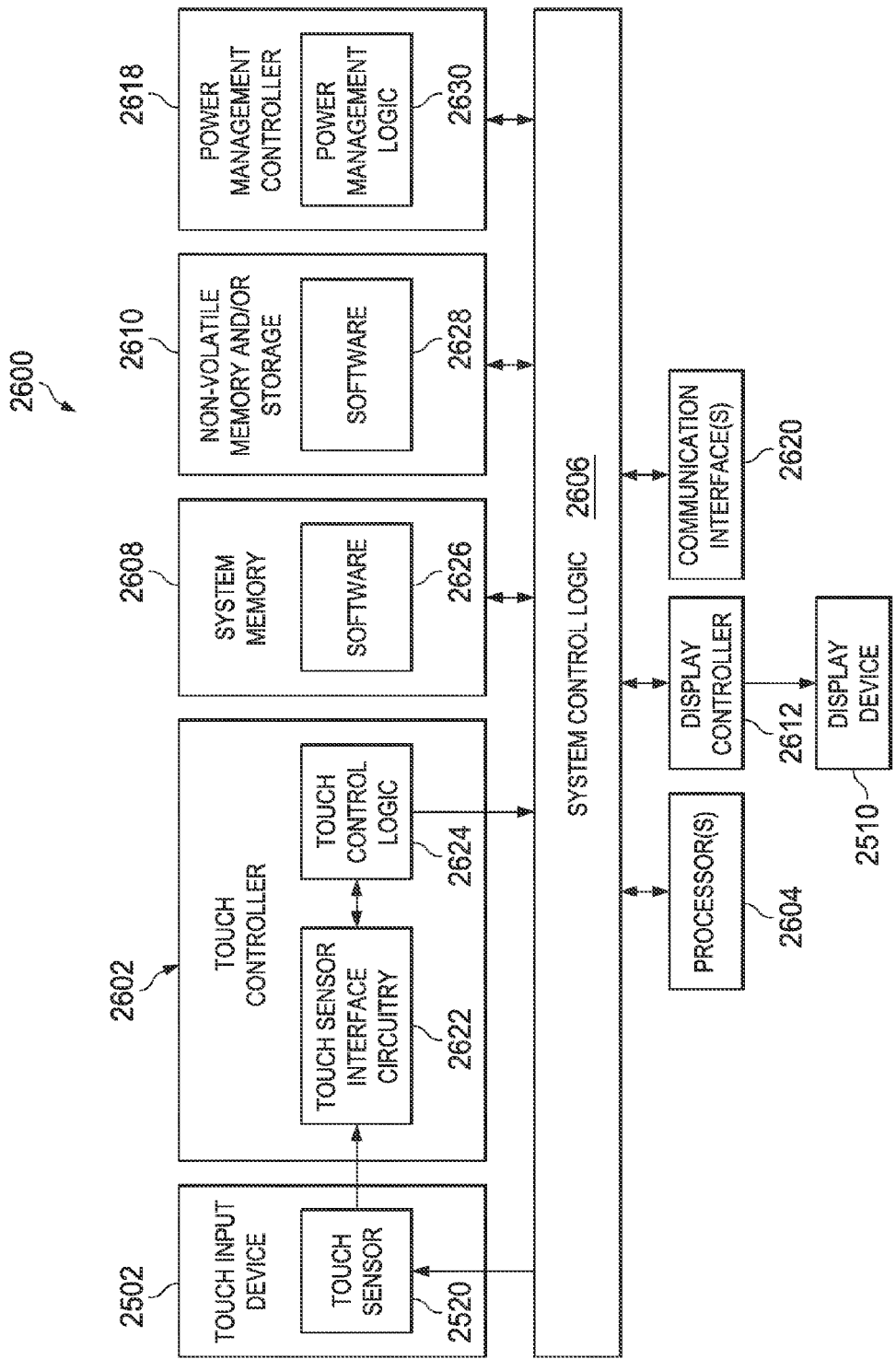
FIG. 19 is a simplified block diagram illustrating potential electronics associated with the electronic device.

FIG. 19 is a simplified block diagram illustrating potential electronics associated with electronic device 10. More particularly, FIG. 19 illustrates an example of an example system 2600 that may be included in any portion (or shared by portions) of electronic device 10. System 2600 includes a touch input device 2502, a touch controller 2602, one or more processors 2604, system control logic 2606 coupled to at least one of processor(s) 2604, system memory 2608 coupled to system control logic 2606, non-volatile memory and/or storage device(s) 2610 coupled to system control logic 2606, display controller 2612 coupled to system control logic 2606, display controller 2612 coupled to a display, power management controller 2618 coupled to system control logic 2606, and communication interfaces 2620 coupled to system control logic 2606.

Touch input device 2502 includes touch sensor 2520 and each may be implemented using any suitable touch-sensitive technology such as, for example and without limitation, capacitive, resistive, surface acoustic wave (SAW), infrared, and optical imaging. Touch input device 2502, in a particular example, may be implemented using any suitable multi-touch technology.

System control logic 2606, in a particular example, may include any suitable interface controllers to provide for any suitable interface to at least one processor 2604 and/or to any suitable device or component in communication with system control logic 2606. System control logic 2606, in a particular example, may include one or more memory controllers to provide an interface to system memory 2608. System memory 2608 may be used to load and store data and/or instructions, for example, for system 2600. System memory 2608, in a particular example, may include any suitable volatile memory, such as suitable dynamic random access memory (DRAM) for example. System control logic 2606, in a particular example, may include one or more input/output (I/O) controllers to provide an interface to a display device, touch controller 2602, and non-volatile memory and/or storage device(s) 2610.

Non-volatile memory and/or storage device(s) 2610 may be used to store data and/or instructions, for example within software 2628. Non-volatile memory and/or storage device(s) 2610 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 2618 includes power management logic 2630 configured to control various power management and/or power saving functions of electronic device 10 based upon whether electronic device 10 is in an open configuration or a closed configuration and/or a physical orientation of electronic device 10. In one example, power management controller 2618 is configured to reduce the power consumption of components or devices of system 2600 that may either be operated at reduced power or turned off when electronic device 10 is in the closed configuration. For example, in a particular example when electronic device 10 is in a closed configuration, power management controller 2618 may perform one or more of the following: power down the unused portion of the display and/or any backlight associated therewith; allow one or more of processor(s) 2604 to go to a lower power state if less computing power is required in the closed configuration; and shutdown any devices and/or components, such as keyboard 108, that are unused when electronic device 10 is in the closed configuration.

Communications interface(s) 2620 may provide an interface for system 2600 to communicate over one or more networks and/or with any other suitable device. Communications interface(s) 2620 may include any suitable hardware and/or firmware. Communications interface(s) 2620, in a particular example, may include, for example, a network adapter, a wireless network adapter, a telephone modem, and/or a wireless modem.

System control logic 2606, in a particular example, may include one or more input/output (I/O) controllers to provide an interface to any suitable input/output device(s) such as, for example, an audio device to help convert sound into corresponding digital signals and/or to help convert digital signals into corresponding sound, a camera, a camcorder, a printer, and/or a scanner.

For one example, at least one processor 2604 may be packaged together with logic for one or more controllers of system control logic 2606. In one example, at least one processor 2604 may be packaged together with logic for one or more controllers of system control logic 2606 to form a System in Package (SiP). In one example, at least one processor 2604 may be integrated on the same die with logic for one or more controllers of system control logic 2606. For a particular example, at least one processor 2604 may be integrated on the same die with logic for one or more controllers of system control logic 2606 to form a System on Chip (SoC).

For touch control, touch controller 2602 may include touch sensor interface circuitry 2622 and touch control logic 2624. Touch sensor interface circuitry 2622 may be coupled to detect touch input over a first touch surface layer and a second touch surface layer of display 26 (i.e., display device 2510). Touch sensor interface circuitry 2622 may include any suitable circuitry that may depend, for example, at least in part on the touch-sensitive technology used for touch input device 2502. Touch sensor interface circuitry 2622, in one example, may support any suitable multi-touch technology. Touch sensor interface circuitry 2622, in one example, may include any suitable circuitry to convert analog signals corresponding to a first touch surface layer and a second surface layer into any suitable digital touch input data. Suitable digital touch input data for one example may include, for example, touch location or coordinate data.

Touch control logic 2624 may be coupled to help control touch sensor interface circuitry 2622 in any suitable manner to detect touch input over a first touch surface layer and a second touch surface layer. Touch control logic 2624 for one example may also be coupled to output in any suitable manner digital touch input data corresponding to touch input detected by touch sensor interface circuitry 2622. Touch control logic 2624 may be implemented using any suitable logic, including any suitable hardware, firmware, and/or software logic (e.g., non-transitory tangible media), that may depend, for example, at least in part on the circuitry used for touch sensor interface circuitry 2622. Touch control logic 2624 for one example may support any suitable multi-touch technology.

Touch control logic 2624 may be coupled to output digital touch input data to system control logic 2606 and/or at least one processor 2604 for processing. At least one processor 2604 for one example may execute any suitable software to process digital touch input data output from touch control logic 2624. Suitable software may include, for example, any suitable driver software and/or any suitable application software. As illustrated in FIG. 19, system memory 2608 may store suitable software 2626 and/or non-volatile memory and/or storage device(s).

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example examples have been described. Various modifications and changes may be made to such examples without departing from the scope of the appended claims. The description and drawings are, accordingly, to be regarded in an illustrative rather than a restrictive sense. It should also be noted that the terms 'electronic device' and 'tablet' have been used interchangeably herein in this document.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Implementations

Example 1 can include an electronic device, such as a notebook computer or laptop, which includes a circuit board coupled to a plurality of electronic components (which includes any type of hardware, elements, circuitry, etc.). The electronic device may also include a connector assembly that is to be positioned within at least a portion of a recess of the electronic device, where the connector assembly includes: a first assembly (e.g., a universal serial bus (USB) assembly) that is to receive a connector (e.g., a USB component such as a USB cable, wire, male or female connector, thumb-drive, flash drive, etc.); and a second assembly (e.g., a subscriber identification module (SIM) assembly) that is to receive an identification module (e.g., a SIM card) that is to provide an association between a user and the electronic device.

In Example 2, the subject matter of Example 1 can optionally include an audio jack assembly that is to receive an audio input, where the audio jack assembly is provided concentrically with a circular recess of the electronic device. In more particular implementations, the audio jack assembly is secured by a retention mechanism that is to receive an object from an internal portion of the circular recess. Additionally, the audio jack assembly can further include a spring-loaded contact that is to be loaded against a shaft of a clutch mechanism of the electronic device. An electrical pathway can be defined from the shaft of the clutch through the spring-loaded contact. The spring-loaded contact can be a post that provides a connection to a circuit board of the audio jack assembly.

In Example 3, an electronic device may include means for receiving a connector assembly (e.g., through any suitable hardware, housing, etc.) that is to be positioned within a recess of an electronic device, where the connector assembly may include a USB assembly that is to receive a USB component; and a SIM assembly that is to receive a SIM card that is to provide an association between a user and the electronic device. The electronic device may also include means for facilitating an electrical contact between the electronic device and the connector assembly (e.g., using any suitable interface, link, bus, communication pathway, hardware, processor, software, circuitry, a hub, a controller, etc.).

What is claimed is:
1. An electronic device, comprising:
   an audio jack assembly that is to receive an audio input, wherein the audio jack assembly is provided concentrically with a circular recess of the electronic device, wherein the circular recess is within a hinge assembly of the electronic device, and wherein the audio jack assembly is in engagement with the hinge assembly.
2. The electronic device of claim 1, wherein the audio jack assembly is secured by a snap ring that is to mate with an internal portion of a ferrous ring.
3. The electronic device of claim 1, wherein the audio jack assembly further comprises:
   a spring-loaded contact that is loaded against a shaft of a clutch mechanism of the electronic device.
4. The electronic device of claim 3, wherein an electrical pathway is defined from the shaft of the clutch through the spring-loaded contact.

5. The electronic device of claim 3, wherein the spring-loaded contact is a post to provide a connection to a circuit board of the audio jack assembly.

6. The electronic device of claim 1, wherein the hinge assembly is configured to couple a top portion and a base portion of the electronic device.

7. The electronic device of claim 1, wherein the hinge assembly is configured to couple a portion of the electronic device to an accessory.

8. A connector assembly for an electronic device, comprising:
- an audio jack module, wherein the audio jack module is configured to be installed concentrically with a circular recess of the electronic device, wherein the circular recess is within a hinge assembly of the electronic device, and wherein the audio jack module is configured to be in engagement with the hinge assembly.

9. The connector assembly of claim 8, wherein the audio jack module is configured to be secured by a snap ring that is to mate with an internal portion of a ferrous ring.

10. The connector assembly of claim 8, wherein the audio jack module further comprises:
- a spring-loaded contact that is configured to be loaded against a shaft of a clutch mechanism of the electronic device.

11. The connector assembly of claim 10, wherein an electrical pathway is defined from the shaft of the clutch through the spring-loaded contact.

12. The connector assembly of claim 10, wherein the spring-loaded contact is a post to provide a connection to a circuit board of the audio jack module.

13. The connector assembly of claim 8, wherein the hinge assembly is configured to couple a top portion and a base portion of the electronic device.

14. The connector assembly of claim 8, wherein the hinge assembly is configured to couple a portion of the electronic device to an accessory.

15. A method for assembling a connector assembly for an electronic device, comprising:
- receiving an audio jack assembly concentrically with a circular recess of the electronic device, wherein the circular recess is within a hinge assembly of the electronic device, and wherein the audio jack assembly is configured to be in engagement with the hinge assembly; and
- facilitating an electrical contact between the electronic device and the audio jack assembly.

* * * * *

UNITED STATES PATENT AND TRADEMARK OFFICE
CERTIFICATE OF CORRECTION

| | |
|---|---|
| PATENT NO. | : 9,548,576 B2 |
| APPLICATION NO. | : 14/930124 |
| DATED | : January 17, 2017 |
| INVENTOR(S) | : Sameer Sharma et al. |

It is certified that error appears in the above-identified patent and that said Letters Patent is hereby corrected as shown below:

On the Title Page

Item (54), in Column 1, in "Title", Line 1, delete "CONNECTOR" and insert -- AUDIO JACK ASSEMBLY IN ENGAGEMENT WITH HINGE --, therefor.

In the Specification

In Column 1, Line 1, delete "CONNECTOR" and insert -- AUDIO JACK ASSEMBLY IN ENGAGEMENT WITH HINGE --, therefor.

Signed and Sealed this
Eighteenth Day of April, 2017

Michelle K. Lee
*Director of the United States Patent and Trademark Office*